US012260847B2

(12) United States Patent
Woolery et al.

(10) Patent No.: US 12,260,847 B2
(45) Date of Patent: Mar. 25, 2025

(54) QUICK-RELEASE GUITAR TREMOLO SUSTAIN BLOCK, AND ASSOCIATED ASSEMBLY AND METHOD

(71) Applicant: Hipshot Products, Inc., Interlaken, NY (US)

(72) Inventors: William Woolery, Waterloo, NY (US); Joshua Borisoff, Trumansburg, NY (US)

(73) Assignee: Hipshot Products, Inc., Interlaken, NY (US)

( * ) Notice: Subject to any disclaimer, the term of this patent is extended or adjusted under 35 U.S.C. 154(b) by 227 days.

(21) Appl. No.: 18/109,849

(22) Filed: Feb. 14, 2023

(65) Prior Publication Data

US 2023/0260484 A1 Aug. 17, 2023

Related U.S. Application Data

(60) Provisional application No. 63/310,114, filed on Feb. 15, 2022.

(51) Int. Cl.

| | |
|---|---|
| ***G10D 3/153*** | (2020.01) |
| ***G10D 1/08*** | (2006.01) |
| ***G10D 3/04*** | (2020.01) |
| ***G10D 3/12*** | (2020.01) |

(52) U.S. Cl.

CPC ............ *G10D 3/153* (2020.02); *G10D 1/085* (2013.01); *G10D 3/04* (2013.01); *G10D 3/12* (2013.01)

(58) Field of Classification Search

CPC .......... G10D 3/153; G10D 1/085; G10D 3/04; G10D 3/12

See application file for complete search history.

(56) References Cited

U.S. PATENT DOCUMENTS

| | | | | |
|---|---|---|---|---|
| 2,741,146 A | | 4/1956 | Fender | |
| 4,383,466 A | * | 5/1983 | Shibuya | G10D 3/153 84/313 |
| 4,674,389 A | | 6/1987 | Fender | |
| 4,903,568 A | | 2/1990 | Itoh | |
| 4,967,631 A | | 11/1990 | Rose | |
| 5,083,492 A | | 1/1992 | Gorr | |

(Continued)

FOREIGN PATENT DOCUMENTS

JP 2003114683 A 4/2003

*Primary Examiner* — Robert W Horn

(74) *Attorney, Agent, or Firm* — Lance M. Pritikin

(57) ABSTRACT

Embodiments of a quick-release sustain block, and associated guitar tremolo assembly and method, are disclosed. The sustain block extends along a main axis from a distal end to a proximal end. The proximal end is affixable to a bridge plate of the tremolo assembly. Linearly straight string retention bores extend through the sustain block in parallel with the main axis, and have a ball capture segment and a string housing segment. Each ball capture segment is located between the string housing segment and distal end. The string retention bores have a ball detent defined between the ball capture segment and string housing segment. The string retention bores are in communication with a respective string transfer slot laterally thereof. The forward face of the sustain block is configured to be oriented toward a headstock of a guitar when the bridge plate is in pivotable engagement with the guitar.

43 Claims, 19 Drawing Sheets

(56) References Cited

U.S. PATENT DOCUMENTS

| | | | | |
|---|---|---|---|---|
| 5,847,297 | A * | 12/1998 | Fisher, IV | G10D 3/153 84/313 |
| 7,189,908 | B2 | 3/2007 | Lavineway | |
| 7,557,282 | B2 * | 7/2009 | Holdway | G10D 3/153 84/294 |
| 7,838,752 | B2 * | 11/2010 | LaMarra | G10D 3/04 84/313 |
| 8,546,670 | B2 * | 10/2013 | Finkle | G10D 3/153 84/307 |
| 8,697,969 | B2 | 4/2014 | van Ekstrom | |
| 8,895,823 | B2 * | 11/2014 | Musel | G10D 3/12 84/299 |
| 9,236,036 | B2 * | 1/2016 | Finkle | G10D 3/153 |
| 9,299,324 | B2 * | 3/2016 | van Ekstrom | G10D 3/153 |
| 9,892,717 | B2 * | 2/2018 | Finkle | G10D 1/08 |
| 2004/0074373 | A1 | 4/2004 | Goto | |
| 2018/0082665 | A1 | 3/2018 | Finkle | |
| 2023/0260484 | A1 * | 8/2023 | Woolery | G10D 3/04 84/313 |

* cited by examiner

QUICK-RELEASE GUITAR TREMOLO SUSTAIN BLOCK, AND ASSOCIATED ASSEMBLY AND METHOD

RELATED APPLICATIONS

This application claims the benefit of U.S. Provisional Application No. 63/310,114 filed Feb. 15, 2022, the contents which are incorporated by this reference in their entireties for all purposes as if fully set forth herein.

TECHNICAL FIELD

The present disclosure relates to tremolo assemblies for electric guitars. More particularly, this disclosure relates to guitar tremolo assemblies and methods that incorporate a tremolo sustain block which anchors the ball ends of respective guitar strings.

BACKGROUND

In many conventional guitar tremolo systems incorporating commonly-used tremolo sustain blocks, the process of changing strings involves withdrawing the string out of the respective string bore of the sustain block from the back of the instrument. Then, working from the back of the instrument, a new string is inserted through a slot or hole cut into cover plate on the back of the guitar, through the string bore, up though a slot in bridge plate, then up and over the saddles. In such systems, because the bridge is pivotally attached to the guitar, the sustain block may be out of alignment with the holes in the back plate, thereby making it difficult to feed the strings through. The musician would then have to apply a slight pressure on the tremolo arm handle to move the sustain block into position to feed the strings through the back plate. Strings are then attached to the tuning machines, then finally brought up to a specific pitch. In such conventional expedients, changing strings can be a time consuming and tedious process What is needed are improvements in tremolo sustain blocks, and associated assemblies and methods, which simplify the process of changing strings by facilitating string changes through top of the guitar rather than through the back of the guitar. One advantage of such improvements is that it could allow a musician to change strings in standing position with the guitar strapped on, as it may alleviate the need to take off the instrument and lay it face down on a surface to thread strings though a back cover.

SUMMARY

Certain deficiencies of the prior art are overcome by the provision of a quick-release guitar tremolo sustain block, and assemblies and methods incorporating the same, as disclosed herein.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
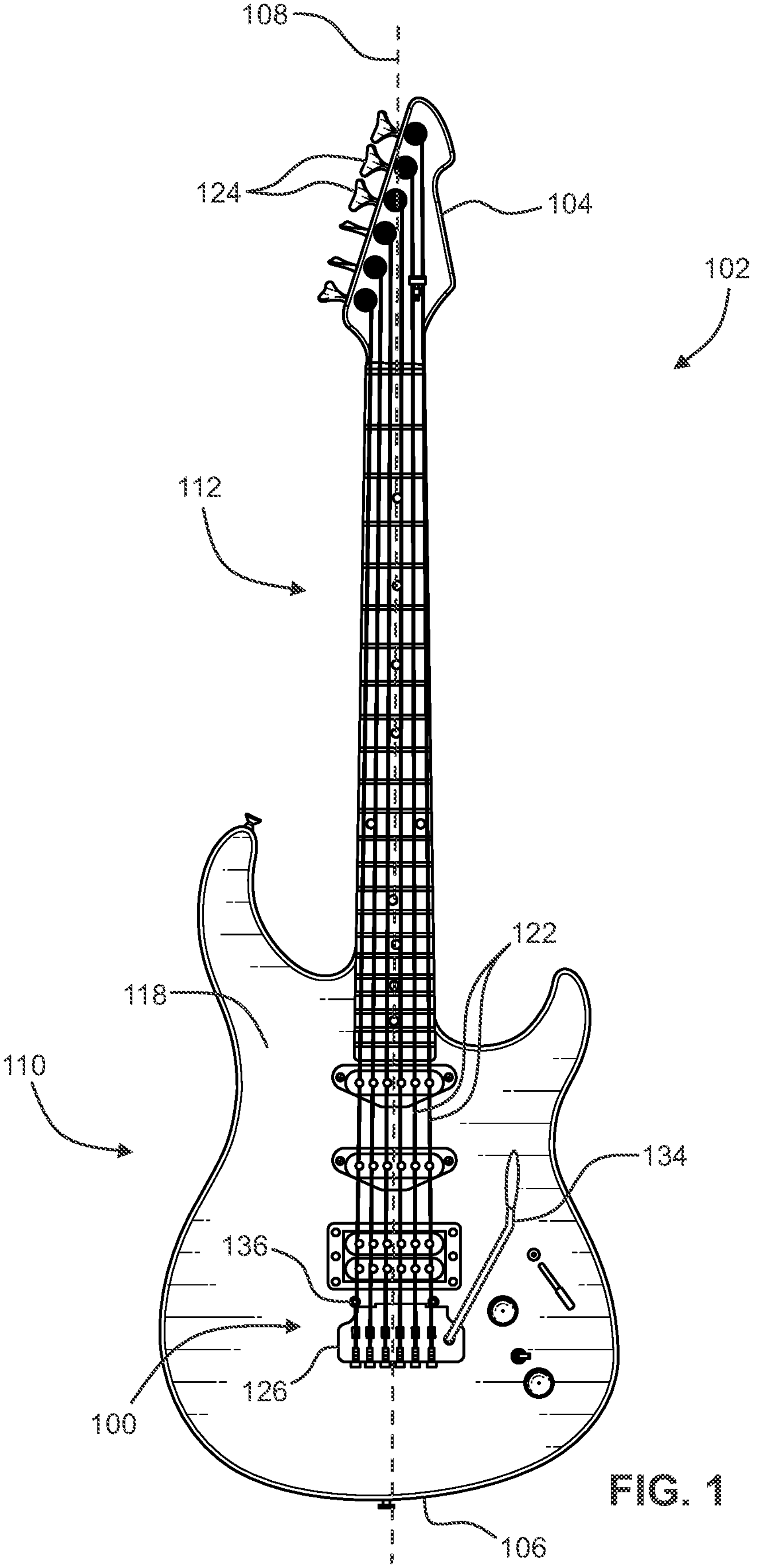
FIG. 1 is a diagrammatic plan view of one example guitar incorporating a guitar tremolo assembly in accordance with the present disclosure.

The present disclosure includes tremolo sustain blocks, associated guitar tremolo assemblies, and methods of installing a guitar string on a guitar incorporating such tremolo assemblies.

Referring now to the drawings, like reference numerals designate identical or corresponding features throughout the several views.

With reference to the various figures herein, certain preferred examples of a sustain block are shown generally at 140, and certain preferred examples of corresponding guitar tremolo assemblies are shown generally at 100.

Figure 7:
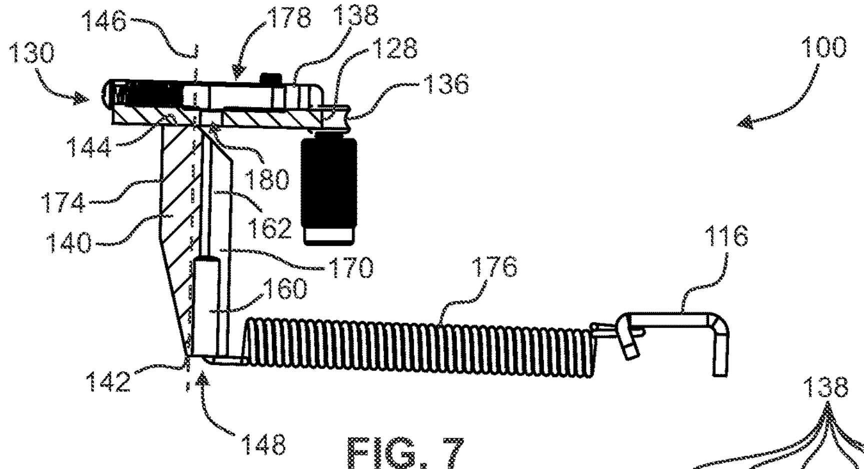
FIG. 7 is a diagrammatic cross-sectional view taken along lines 7-7 in FIG. 6.
Figure 8:
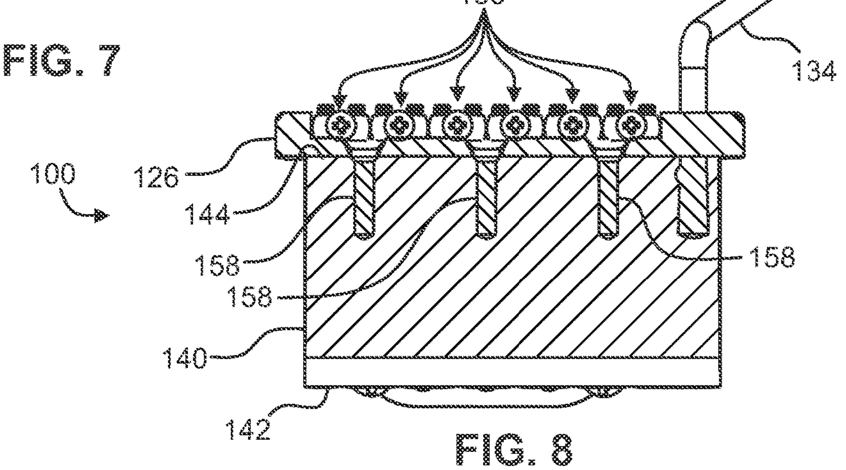
FIG. 8 is a diagrammatic cross-sectional view taken along lines 8-8 in FIG. 6.
Figure 9:
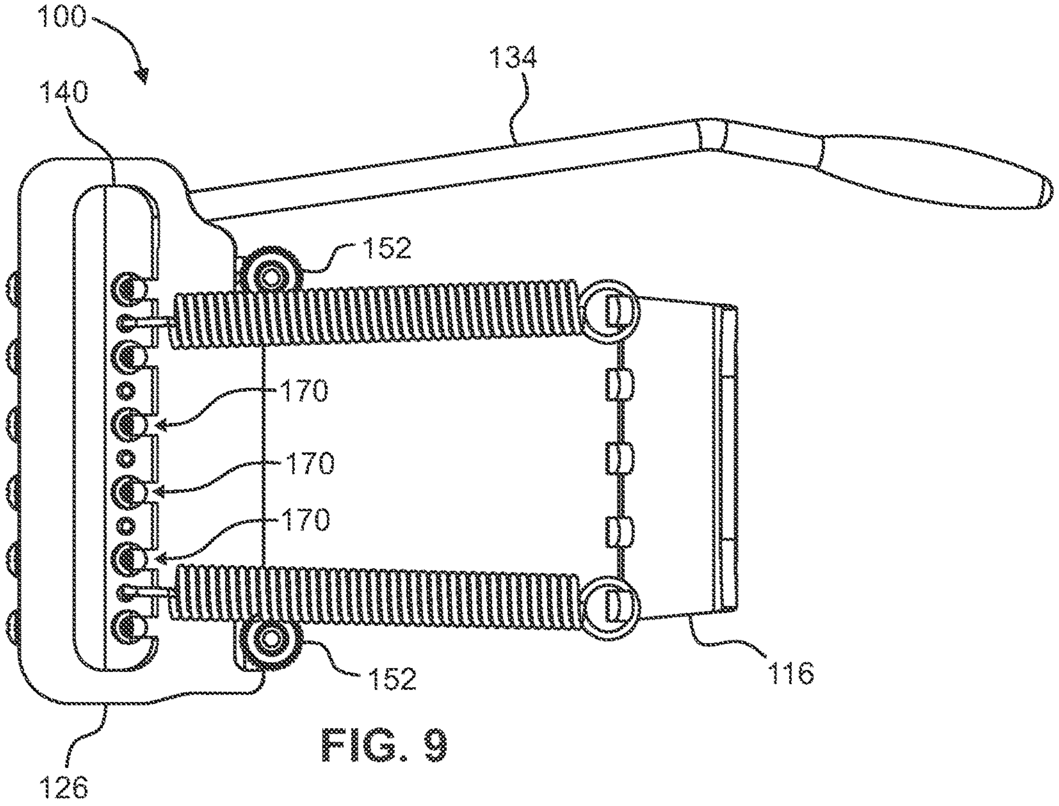
FIG. 9 is a diagrammatic bottom view of the example guitar tremolo assembly of FIG. 2.
Figure 10:
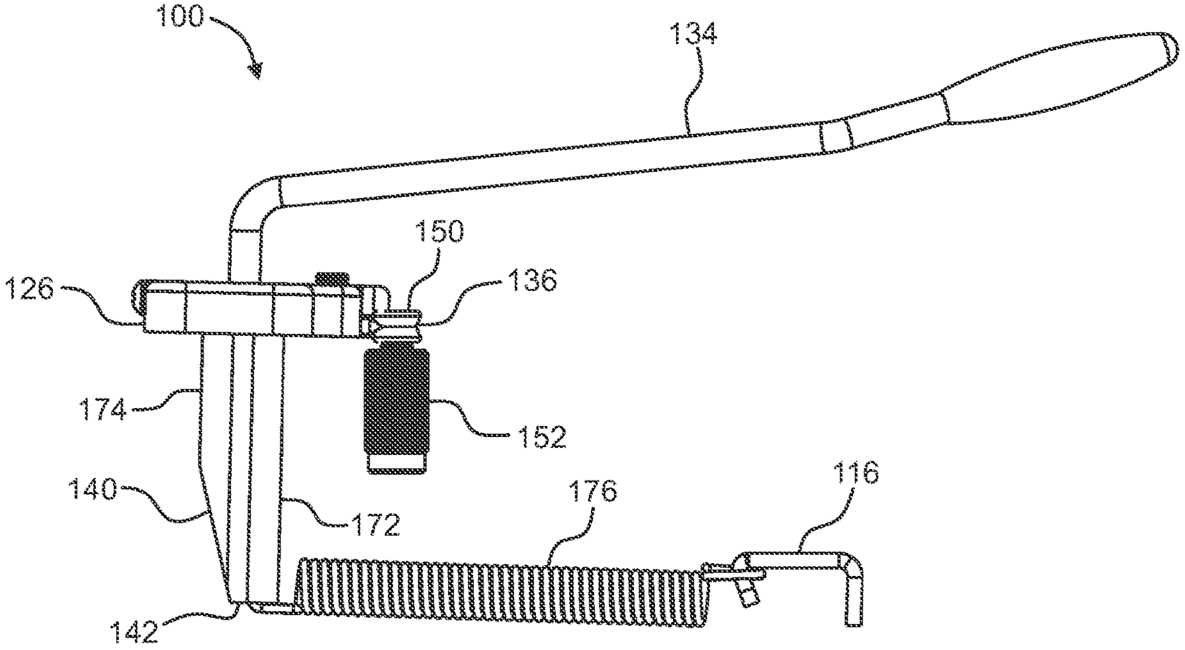
FIG. 10 is a diagrammatic side view of the example guitar tremolo assembly of FIG. 2.
Figure 12:
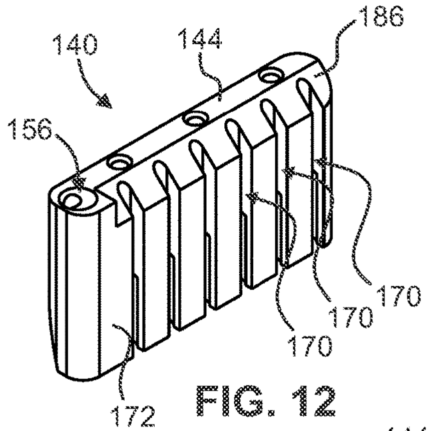
FIG. 12 is a diagrammatic perspective view of a first example of a sustain block, which corresponds to the example guitar tremolo assembly of FIG. 2.
Figure 16:
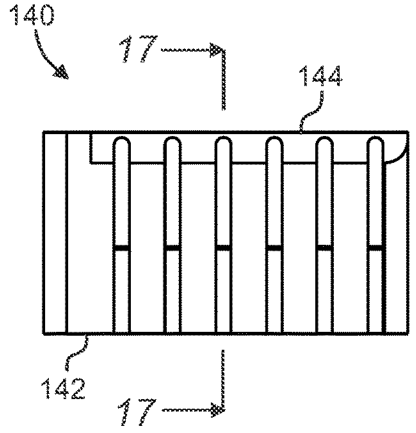
FIG. 16 is a diagrammatic front view of the sustain block of FIG. 12.
Figure 17:
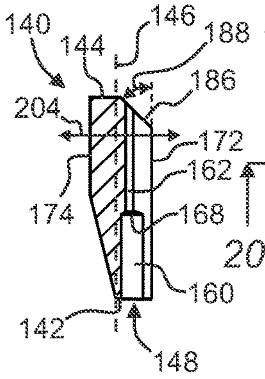
FIG. 17 is a diagrammatic cross-sectional view taken along lines 17-17 in FIG. 16.
Figure 18:
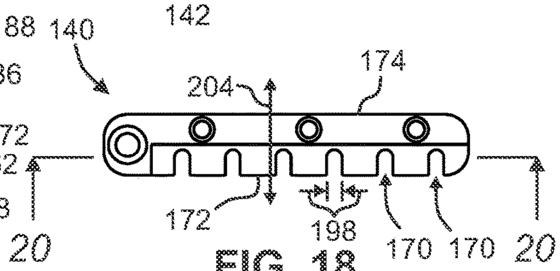
FIG. 18 is a diagrammatic top view of the sustain block of FIG. 12.
Figure 19:
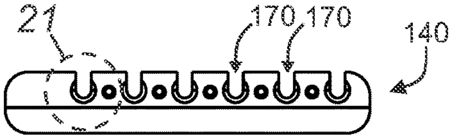
FIG. 19 is a diagrammatic bottom view of the sustain block of FIG. 12.
Figure 20:
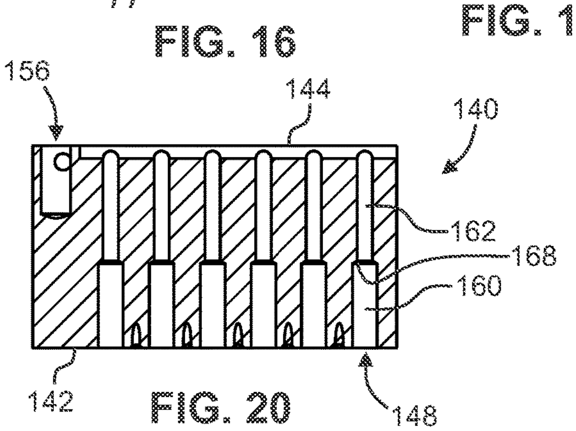
FIG. 20 is a diagrammatic cross-sectional view taken along lines 20-20 in FIG. 18.

Referring to FIGS. 12, 16 and 17, a sustain block 140 for a guitar tremolo assembly may extend along a block main axis 146 from a distal end 142 to a proximal end 144. Referring to FIGS. 7 and 8, the proximal end 144 may be configured to be affixed to a bridge plate element 126 of the corresponding guitar tremolo assembly 100, for example, by way of block fastener elements 158 (e.g., screws). The sustain block 140 may have a plurality of string retention bores 148 extending therethrough, for example, in parallel with the block main axis 146.

Figure 29:
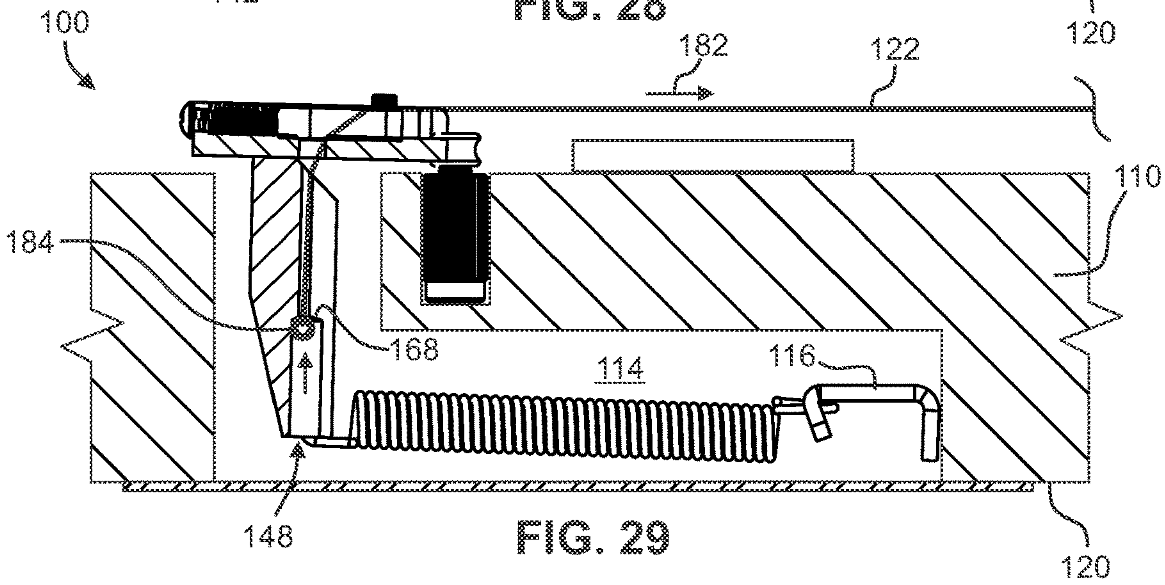
Figure 30:
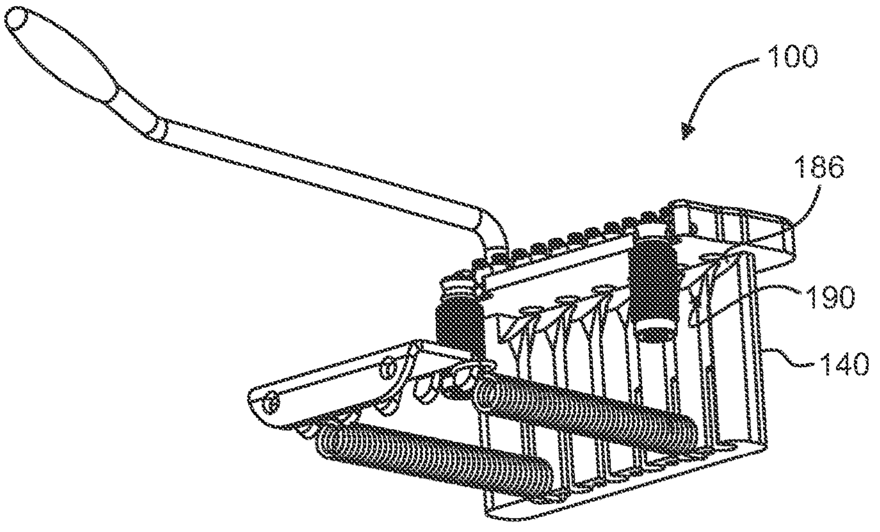
FIG. 30 is a diagrammatic view of a second example of a guitar tremolo assembly in accordance with the present disclosure.

Referring to FIG. 17, each string retention bore 148 may preferably be linearly straight, and may have a ball capture segment 160 and a string housing segment 162. The ball capture segment 160 may be located between the string housing segment 162 and the distal end 142. Each string retention bore 160 may have a ball detent 168 defined between the ball capture segment 160 and the string housing segment 162. Referring to FIGS. 17 and 29, the ball detent 168 may be configured to prevent a string ball end 184 from passing from the ball capture segment 160 into the string housing segment 162. The ball detent 168 may take the form of a shoulder defined by the transition between the ball capture segment 160 and the string housing segment 162. For example, the string housing segment 162 may have a string housing diameter 166 less than the diameter of a conventional string ball end 184. More particular, in certain examples of a sustain block 140, the string housing diameter may be about 0.125 inches or 3.175 mm, whereas the ball segment diameter 164 may be about 0.2 inches or about 5 mm.

Figure 13:
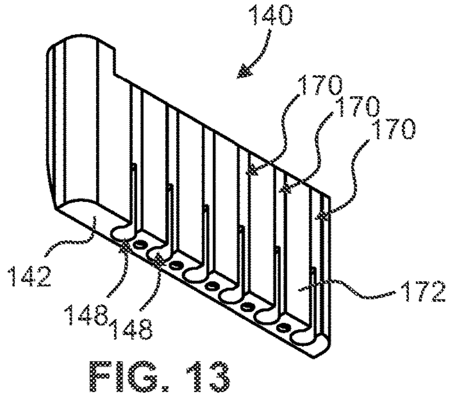
FIG. 13 is a further diagrammatic perspective view of the sustain block of FIG. 12.
Figure 14:
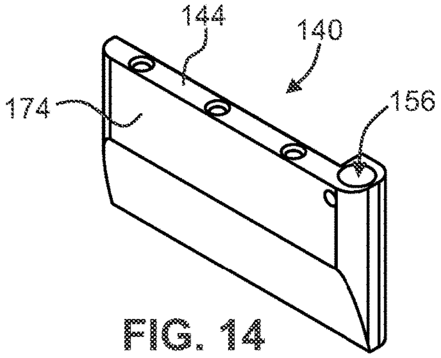
FIG. 14 is another diagrammatic perspective view of the sustain block of FIG. 12.
Figure 15:
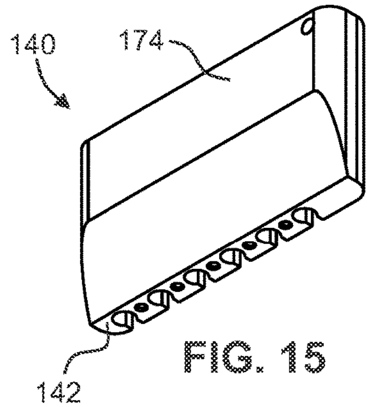
FIG. 15 is another diagrammatic perspective view of the sustain block of FIG. 12.
Figure 21:
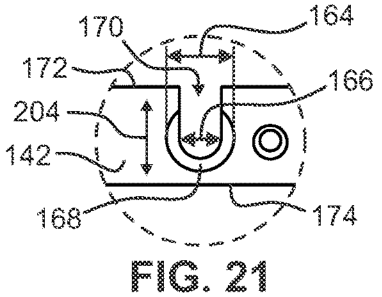
FIG. 21 is a diagrammatic magnified view of detail 21 in FIG. 19.
Figure 22:
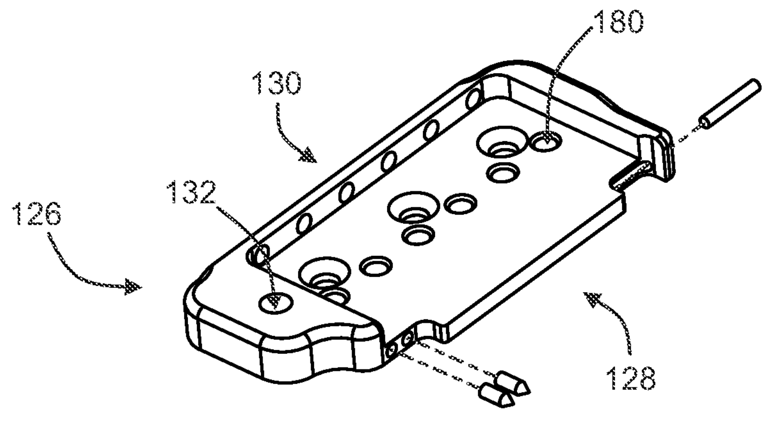
FIG. 22 is a diagrammatic perspective view of one example bridge plate element corresponding to the example guitar tremolo assemblies illustrated herein, wherein the bridge pivot contact pins are shown removed from the corresponding bridge plate element.
Figure 23:
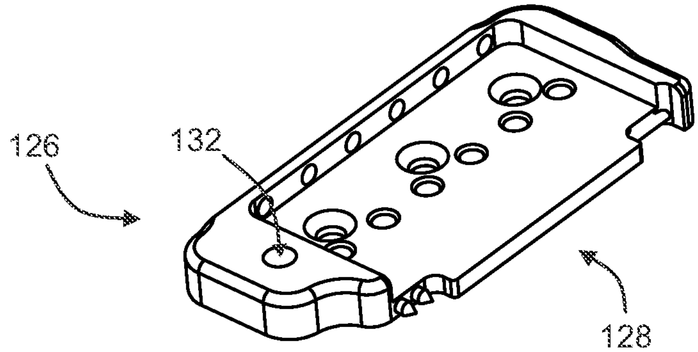
FIG. 23 is a diagrammatic perspective view similar that of FIG. 22, but wherein the bridge plate element is shown fully assembled.
Figure 24:
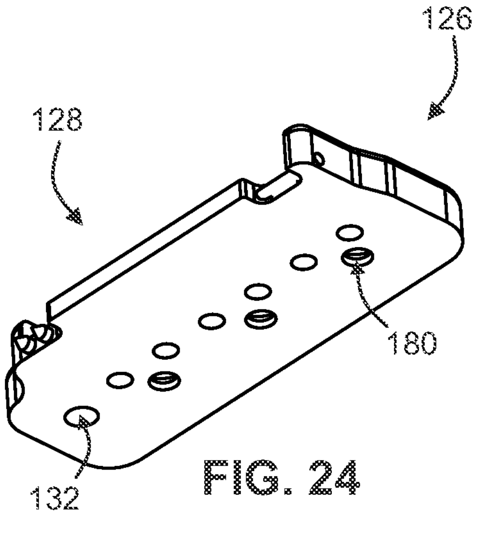
FIG. 24 is a further diagrammatic perspective view of the bridge plate element of FIG. 23.
Figure 25:
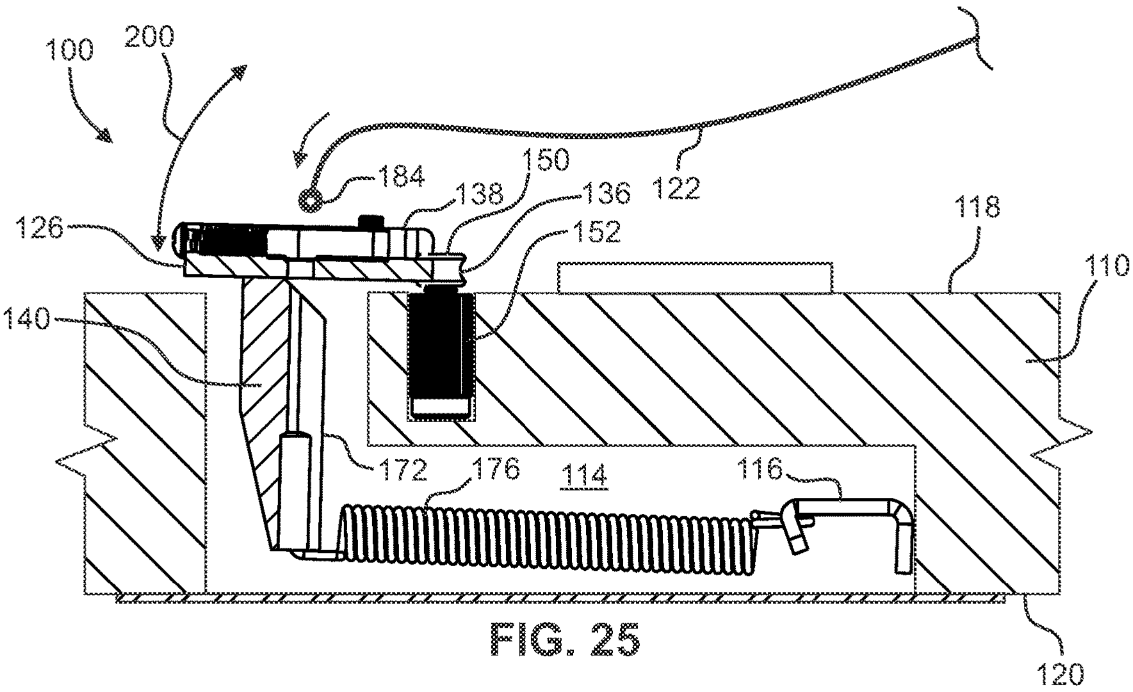
FIGS. 25-29 are diagrammatic partial cross-sectional views of the guitar tremolo assembly of FIG. 2 installed on a guitar, illustrating steps of a method for installing a guitar string on the guitar.

Referring to FIGS. 13 and 21, each of the string retention bores 148 may be in communication with a respective string transfer slot 170 disposed laterally thereof (e.g., see front lateral direction 204). Referring to FIGS. 12 and 14, the sustain block 140 may have a forward face 172 and a rearward face 174 disposed oppositely of one another. Referring to FIGS. 1 and 25, the forward face 172 may be configured to be oriented toward the headstock 104 of the guitar 102 when the bridge plate element 126 is in pivotable engagement with a plate mounting element 136 of the guitar 102. The direction of pivotability of the bridge plate element 126 resulting from the pivotable engagement is shown, for example, at 200 in FIG. 25.

Referring to FIGS. 13 and 21, in particular examples of the sustain block 140, each string transfer slot 170 extends through the forward face 172 to the respective string retention bore 48. Referring to FIGS. 12 and 17, the sustain block 140 may include a ball guide face 186 disposed between the proximal end 144 and the forward face 172. The ball guide face 186 may be angularly offset from the forward face 172 by, for example, 30 to 60 degrees. In certain preferred examples of such a sustain block 140, this angular offset 188 may be 45 degrees.

Figure 31:
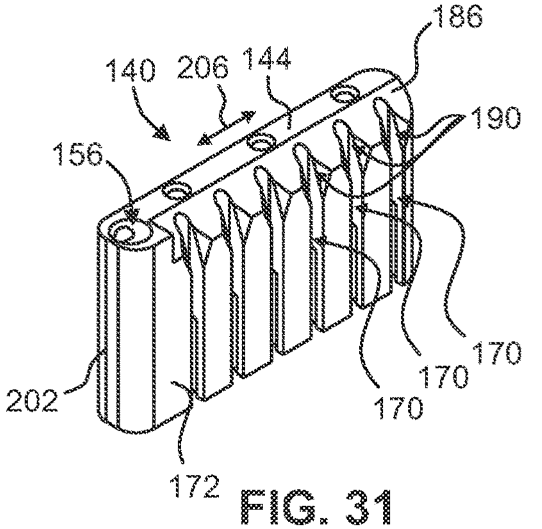
FIG. 31 is a diagrammatic perspective view of a second example of a sustain block, which corresponds to the example guitar tremolo assembly of FIG. 30.
Figure 32:
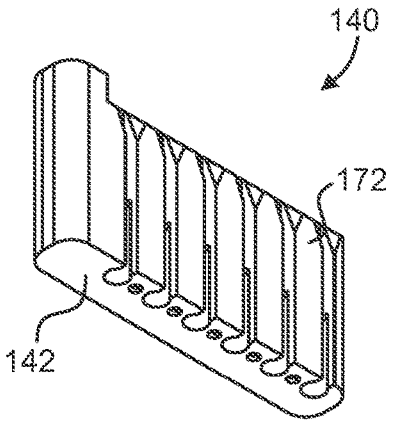
FIG. 32 is a further diagrammatic perspective view of the sustain block of FIG. 31.
Figure 33:
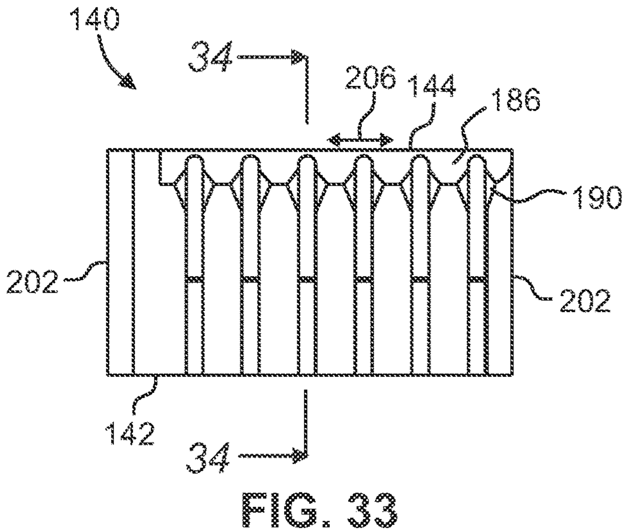
FIG. 33 is a diagrammatic front view of the sustain block of FIG. 31.
Figure 34:
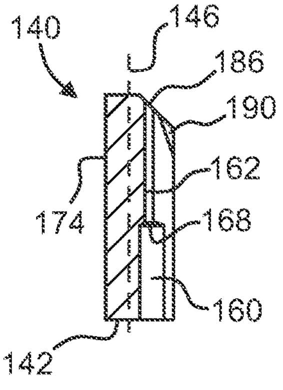
FIG. 34 is a diagrammatic cross-sectional view taken along lines 34-34 in FIG. 33.
Figure 35:
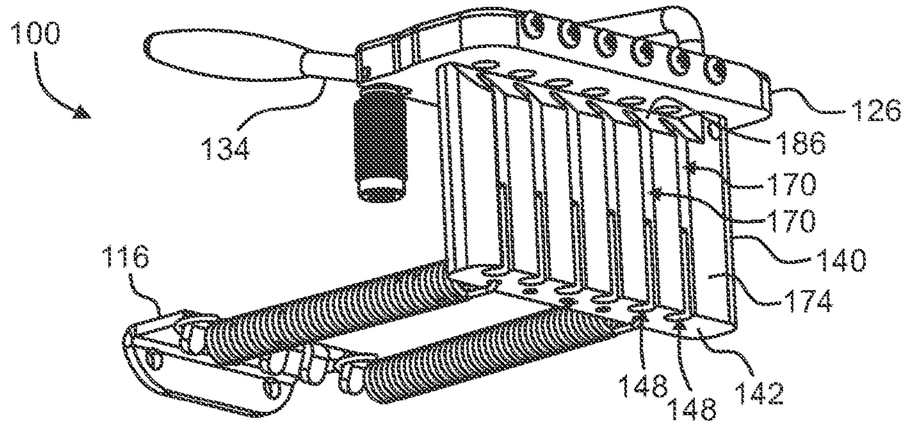
FIG. 35 is a diagrammatic view of a third example of a guitar tremolo assembly in accordance with the present disclosure.
Figure 36:
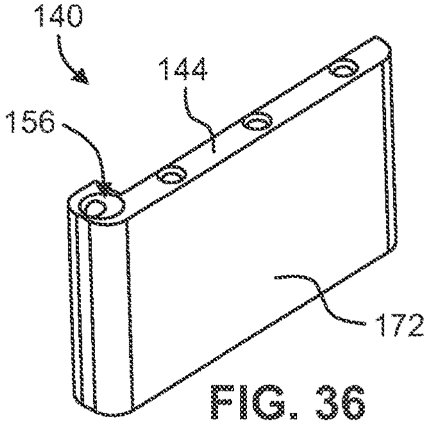
FIG. 36 is a diagrammatic perspective view of a third example of a sustain block, which corresponds to the example guitar tremolo assembly of FIG. 35.
Figure 37:
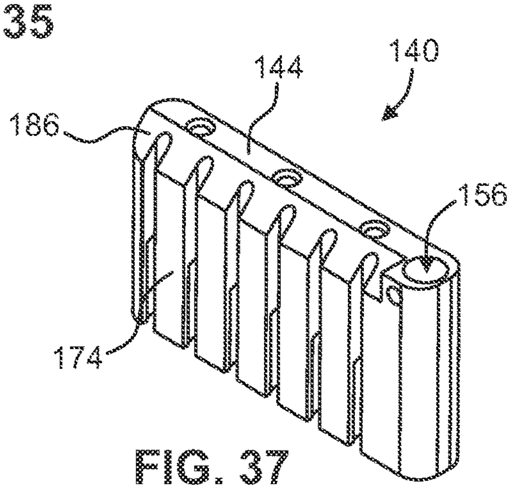
FIG. 37 is a further diagrammatic perspective view of the sustain block of FIG. 36.

Referring to FIG. 31, certain examples of the sustain block 140 may include a ball alignment channel 190 disposed at each junction between the forward face 172, the ball guide face 186 and the string transfer slots 170. As shown for example in FIG. 31, each ball alignment channel 190 may preferably be defined by a pair of surfaces angularly offset from the forward face 172 and the ball guide face 186.

Referring to FIGS. 35-38, in particular examples of a sustain block 140 each string transfer slot 170 may extend through the rearward face 174 to the respective string retention bore 148. In certain such examples, the sustain block 140 may include a ball guide face 186 disposed between the proximal end 144 and the rearward face 174. The ball guide face being angularly offset from the rearward face by 30 to 60 degrees. In particular preferred examples of such a sustain block 140, this angular offset 188 may be 45 degrees.

Figure 65:
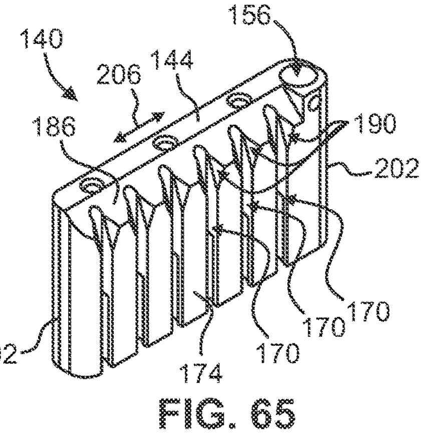
FIG. 65 is a diagrammatic perspective view of a sixth example of a sustain block, which corresponds to the example guitar tremolo assembly of FIG. 64.
Figure 66:
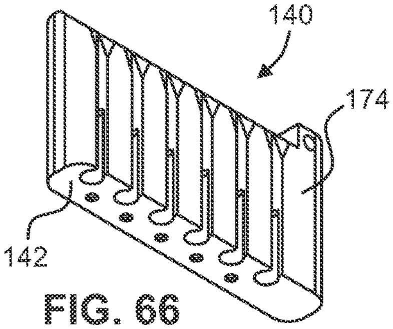
FIG. 66 is a further diagrammatic perspective view of the sustain block of FIG. 65.
Figure 67:
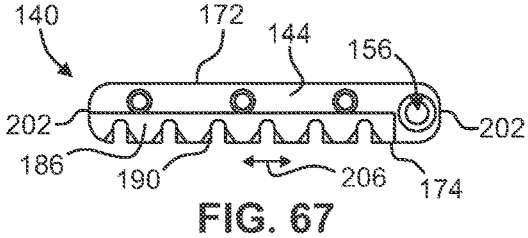
FIG. 67 is a diagrammatic top view of the sustain block of FIG. 65.
Figure 68:
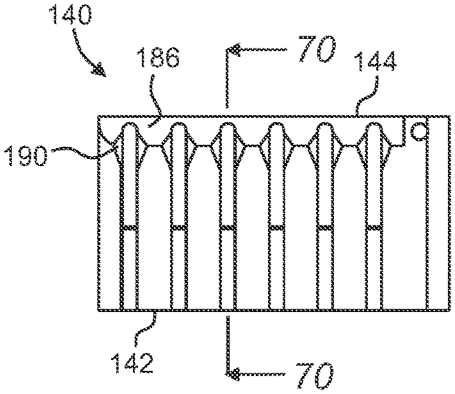
FIG. 68 is a diagrammatic rear view of the sustain block of FIG. 65.
Figure 70:
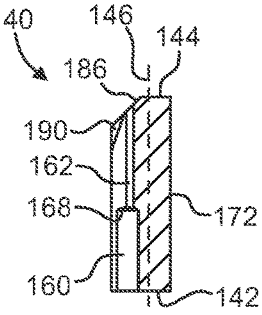
FIG. 70 is a diagrammatic cross-sectional view taken along lines 70-70 in FIG. 68.
Figure 71:
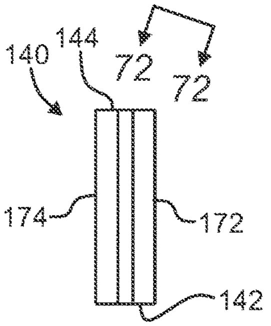
FIG. 71 is a diagrammatic side view of the sustain block of FIG. 65.
Figure 69:
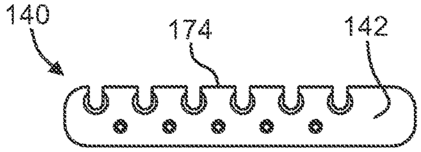
FIG. 69 is a diagrammatic bottom view of the sustain block of FIG. 65.
Figure 72:
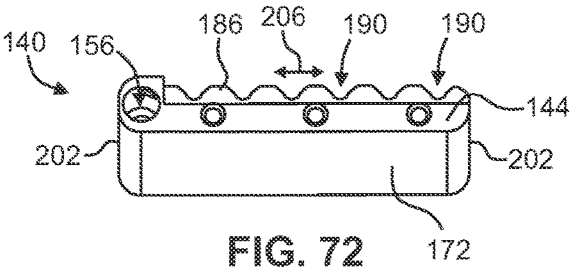
FIG. 72 is a diagrammatic perspective view of the sustain block of FIG. 65, taken along lines 72-72 of FIG. 71.
Figure 73:
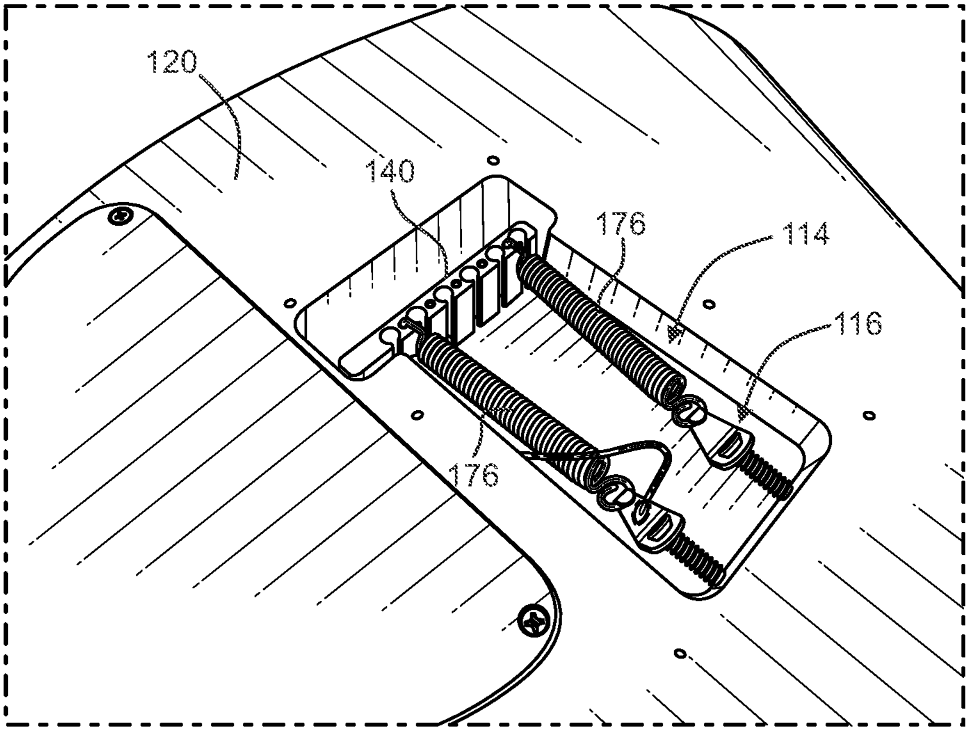
FIG. 73 is a diagrammatic partial perspective view of the back of a guitar incorporating one example sustain block in accordance with the present disclosure.

Referring to FIG. 65, certain examples of the sustain block 140 may include a ball alignment channel 190 disposed at each junction between the rearward face 174, the ball guide face 186 and the string transfer slots 170. As shown for example in FIG. 65, each ball alignment channel 190 may preferably be defined by a pair of surfaces angularly offset from the rearward face 174 and the ball guide face 186.

Figure 46:
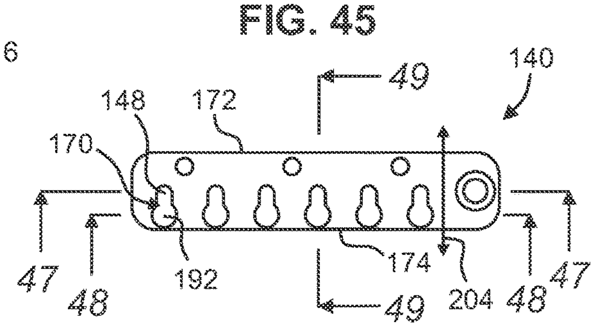
FIG. 46 is a diagrammatic top view of the sustain block of FIG. 43.
Figure 43:
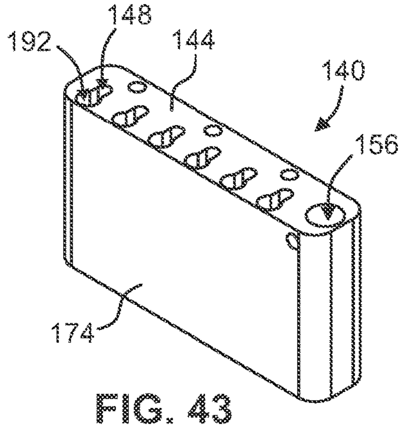
FIG. 43 is a diagrammatic perspective view of a fourth example of a sustain block, which corresponds to the example guitar tremolo assembly of FIG. 42.
Figure 47:
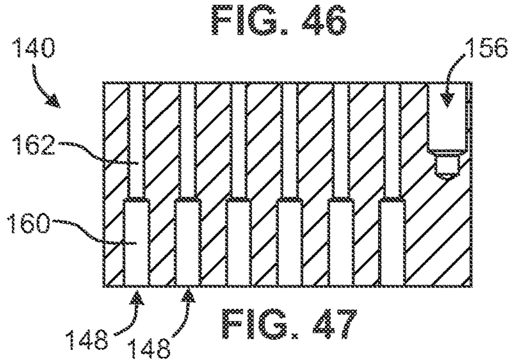
FIG. 47 is a diagrammatic cross-sectional view taken along lines 47-47 in FIG. 46.
Figure 44:
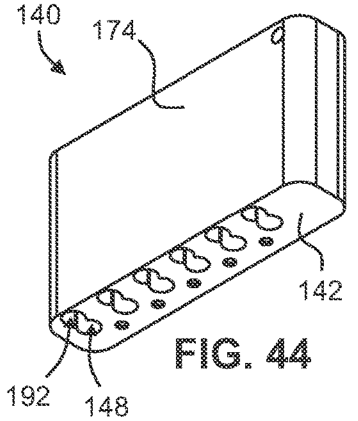
FIG. 44 is a further diagrammatic perspective view of the sustain block of FIG. 43.
Figure 48:
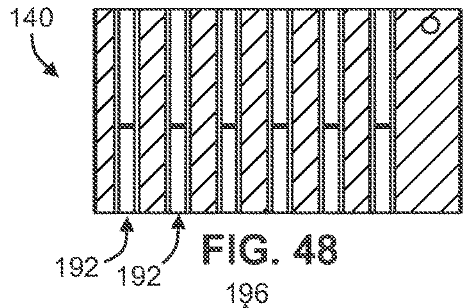
FIG. 48 is a diagrammatic cross-sectional view taken along lines 48-48 in FIG. 46.
Figure 49:
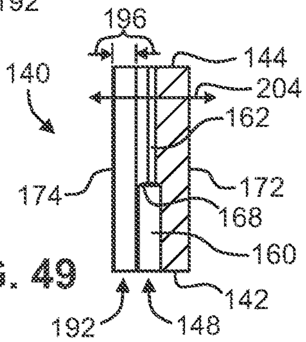
FIG. 49 is a diagrammatic cross-sectional view taken along lines 49-49 in FIG. 46.
Figure 57:
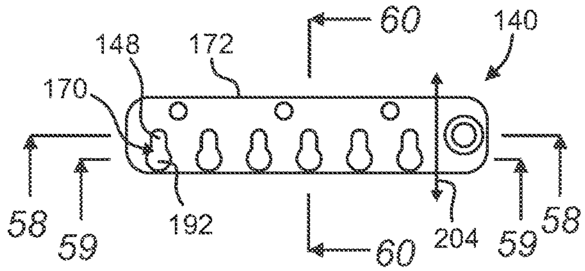
FIG. 57 is a diagrammatic top view of the sustain block of FIG. 54.
Figure 54:
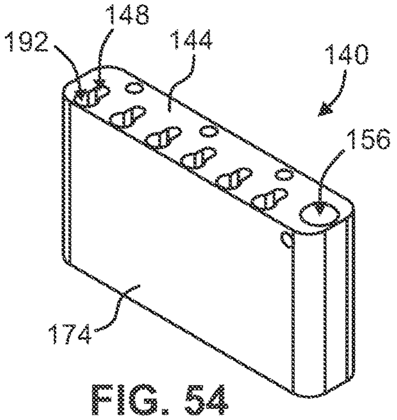
FIG. 54 is a diagrammatic perspective view of a fifth example of a sustain block, which corresponds to the example guitar tremolo assembly of FIG. 53.
Figure 58:
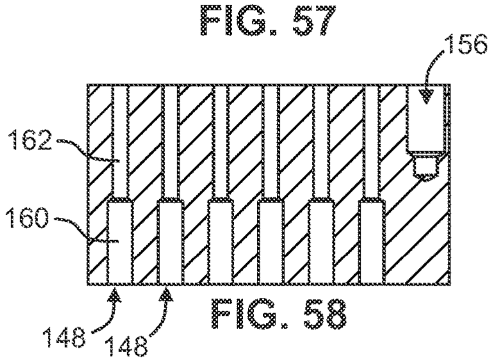
FIG. 58 is a diagrammatic cross-sectional view taken along lines 58-58 in FIG. 57.
Figure 59:
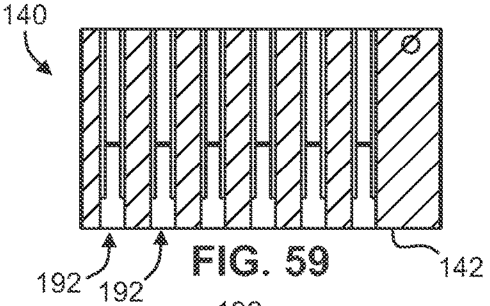
FIG. 59 is a diagrammatic cross-sectional view taken along lines 59-59 in FIG. 57.
Figure 55:
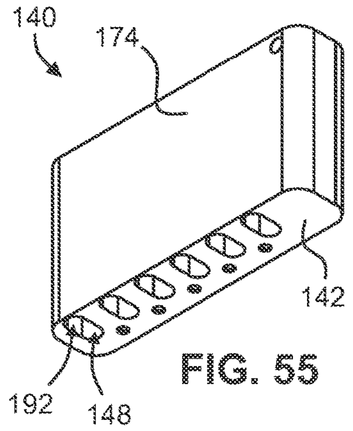
FIG. 55 is a further diagrammatic perspective view of the sustain block of FIG. 54.
Figure 60:
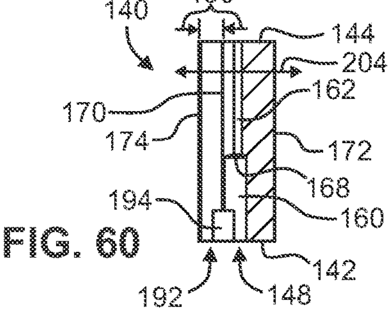
FIG. 60 is a diagrammatic cross-sectional view taken along lines 60-60 in FIG. 57.
Figure 61:
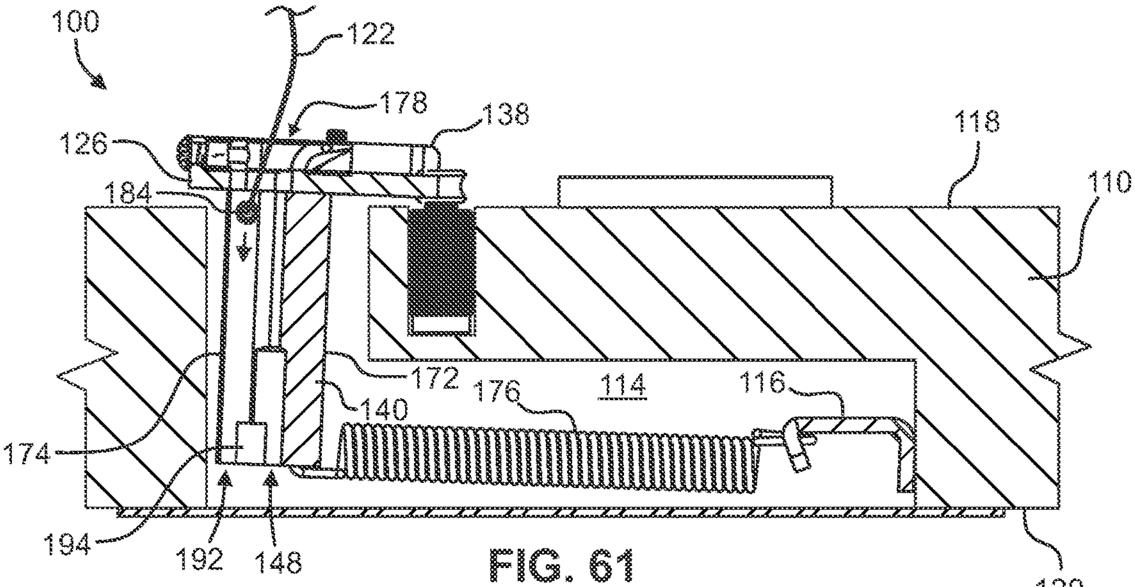
FIGS. 61-63 are diagrammatic partial cross-sectional views of the guitar tremolo assembly of FIG. 53 installed on a guitar, illustrating steps of a method for installing a guitar string on the guitar.

Referring to FIGS. 42-44 and 53-55, certain examples of a sustain block 140 may include a plurality of ball passthrough bores 192 extending therethrough. Referring to FIGS. 49 and 60, each of the ball passthrough bores 192 may be in lateral communication (e.g., see front lateral direction 204) with and extend in parallel with a respective one of the string retention bores 148. Referring to FIGS. 46 and 57, in such examples, the lateral communication may be by way of the respective string transfer slot 170 being disposed laterally between the ball passthrough bore 192 and the string retention bore 148. Referring to FIGS. 49-51 and 60-62, the ball passthrough bores 192 may each have a passthrough bore diameter 196 configured to enable a ball end 184 of a guitar string 122 to pass entirely through the ball passthrough bore 192. In particular examples of a sustain block 140, the passthrough bore diameter 196 may be, for example, about 0.2 inches or about 5 mm. Referring to FIGS. 46 and 57, in certain examples of a sustain block 140, neither the ball passthrough bores 192 nor the string retention bores 148 are in lateral communication with the forward face 172 or rearward face 174.

Figure 62:
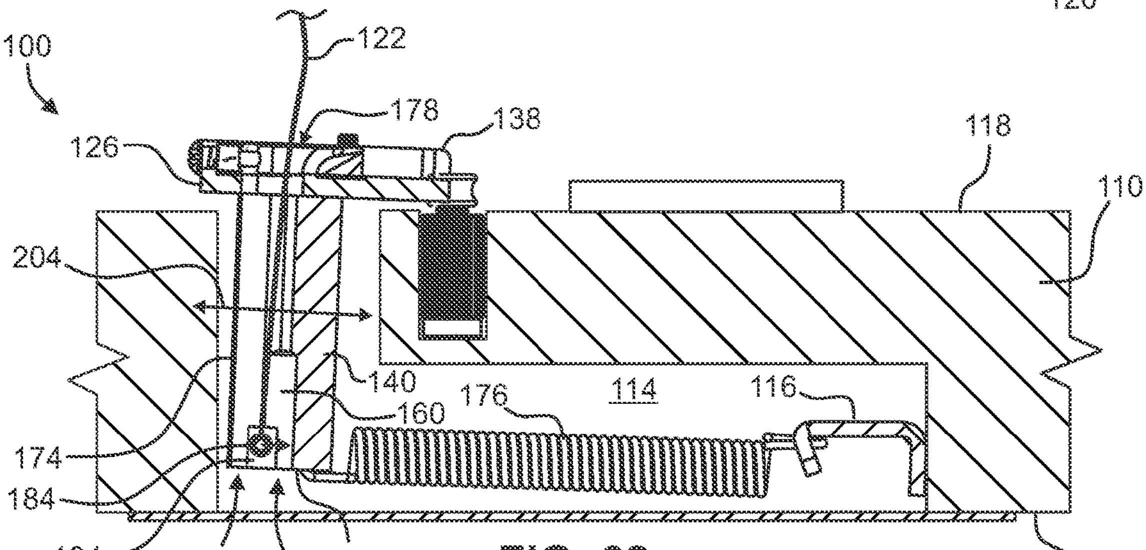
Figure 63:
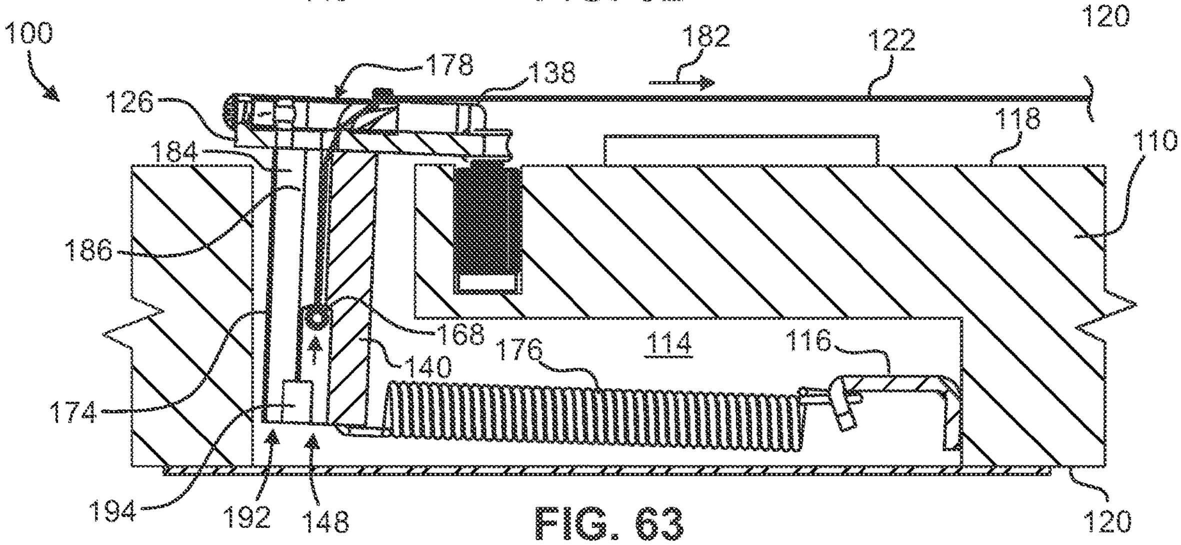

Referring to FIGS. 60-63, particular examples of the sustain block 140 may include a ball transfer slot 194 laterally disposed between each ball passthrough bore 192 and respective ball capture segment 148 (e.g., see front lateral direction 204). Referring to FIGS. 57-60, the ball transfer slot 194 may be positioned between the respective string transfer slot 170 and the distal end 142. Referring to FIG. 62, the ball transfer slot 194 may be configured to allow a ball end 184 of a guitar string 122 to pass laterally therethrough from the respective ball passthrough bore 192 to the respective ball capture segment 160.

Referring to FIGS. 18-21, in certain examples of a sustain block 140, the string transfer slots 170 each have a slot width 198, the ball capture segments 160 may each have a ball segment diameter 164. In such examples, the slot width 198 may preferably be smaller than the ball segment diameter 164. By way of example, the slot width 198 may be about 0.125 inches or about 3.175 mm, and the ball segment diameter 164 may be about 0.2 inches or about 5 mm. This, the slot width 198 may be configured to prevent a ball end 184 of a guitar string 122 from passing through the string transfer slots 170.

Figure 2:
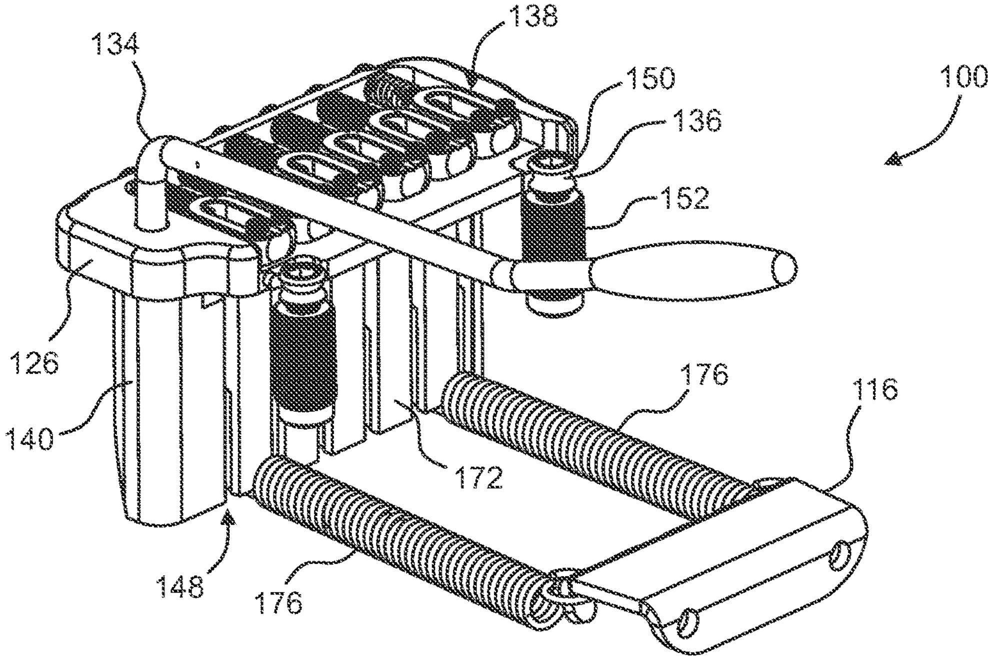
FIG. 2 is a diagrammatic perspective view of a first example of a guitar tremolo assembly in accordance with the present disclosure.
Figure 3:
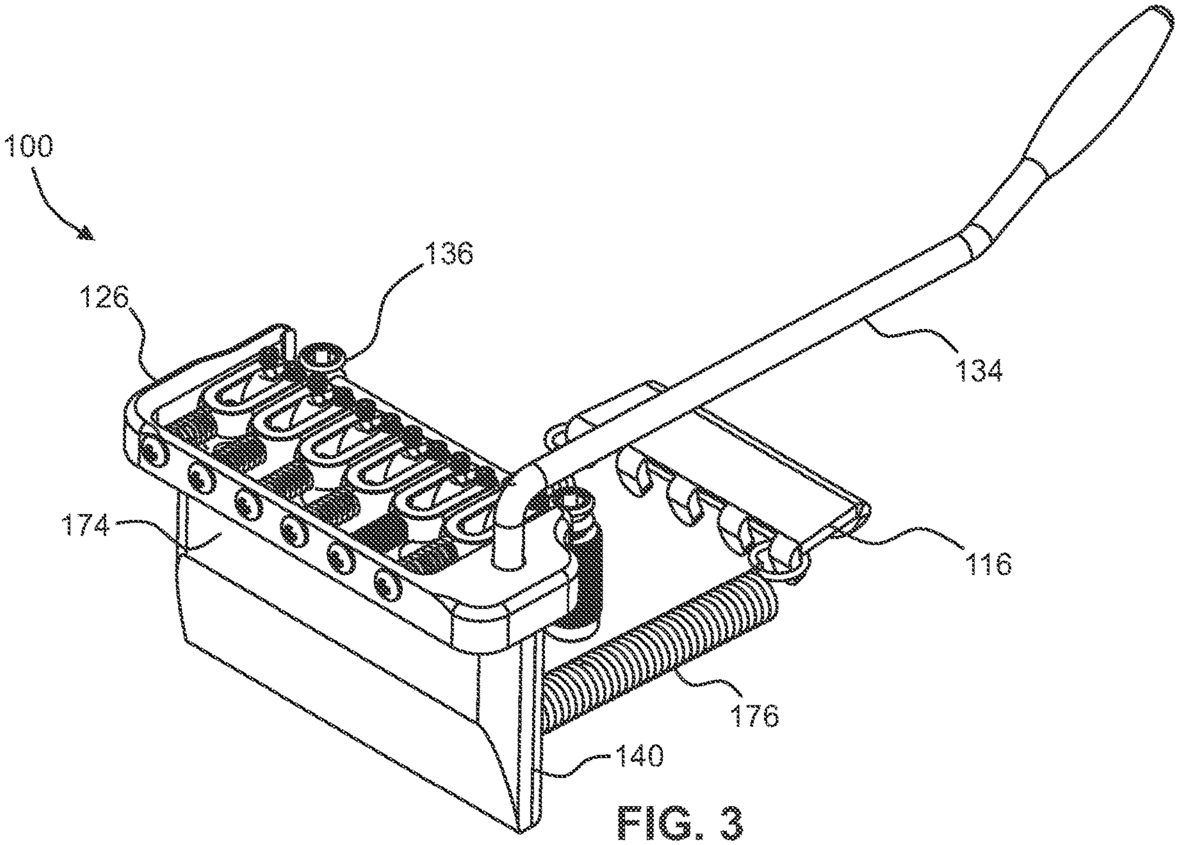
FIG. 3 is a further diagrammatic perspective view of the example guitar tremolo assembly of FIG. 2.
Figure 4:
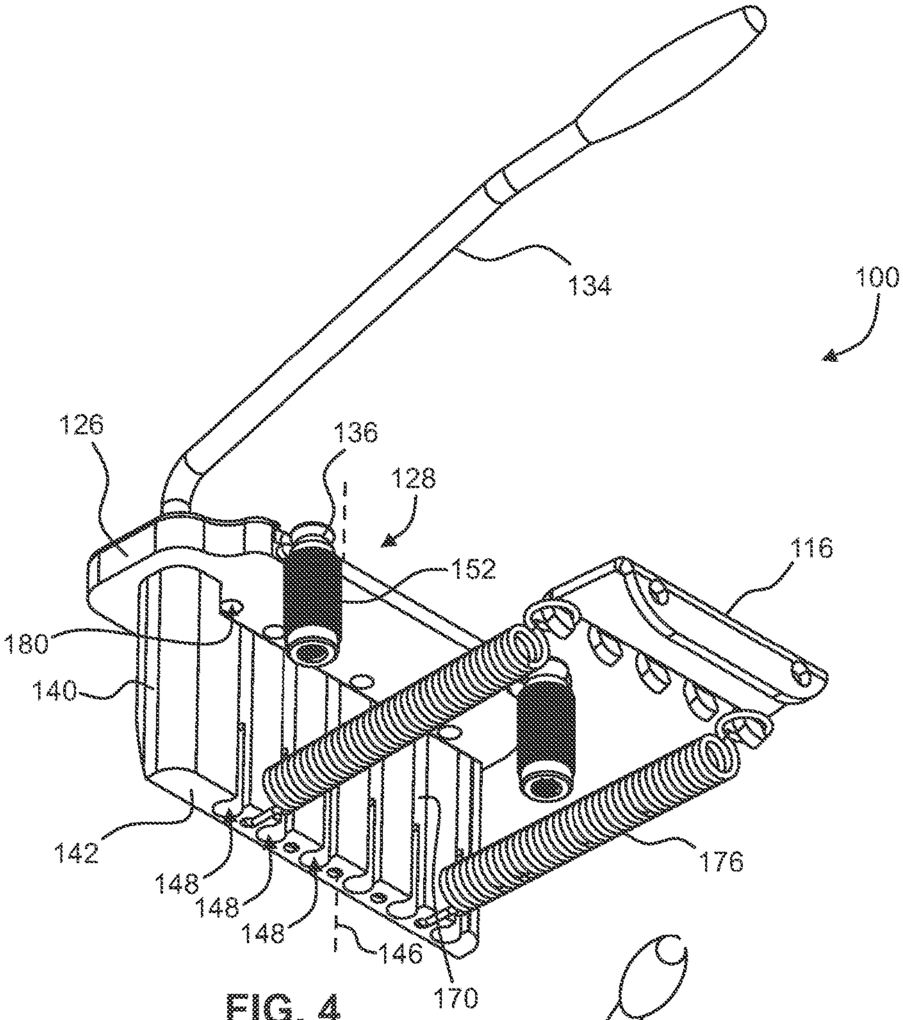
FIG. 4 is a further diagrammatic perspective view of the example guitar tremolo assembly of FIG. 2.
Figure 5:
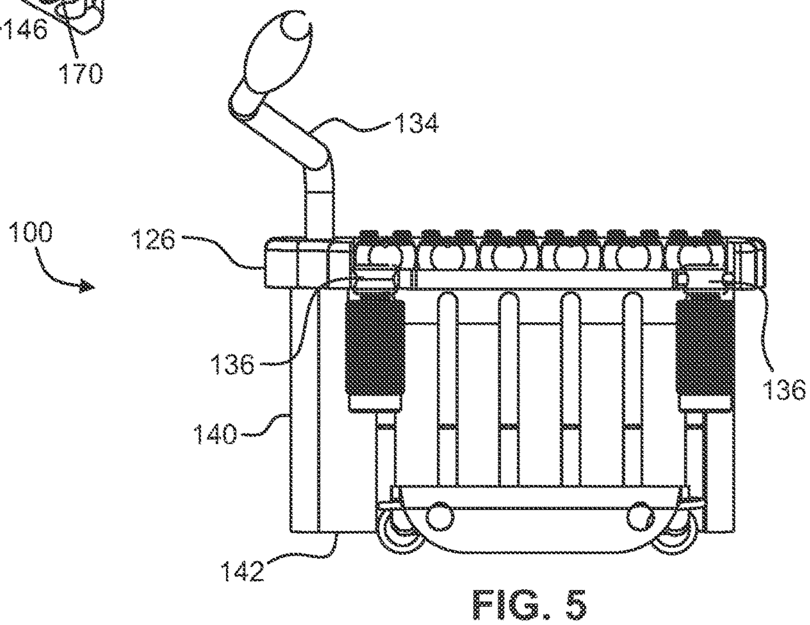
FIG. 5 is a diagrammatic front view of the example guitar tremolo assembly of FIG. 2.
Figure 6:
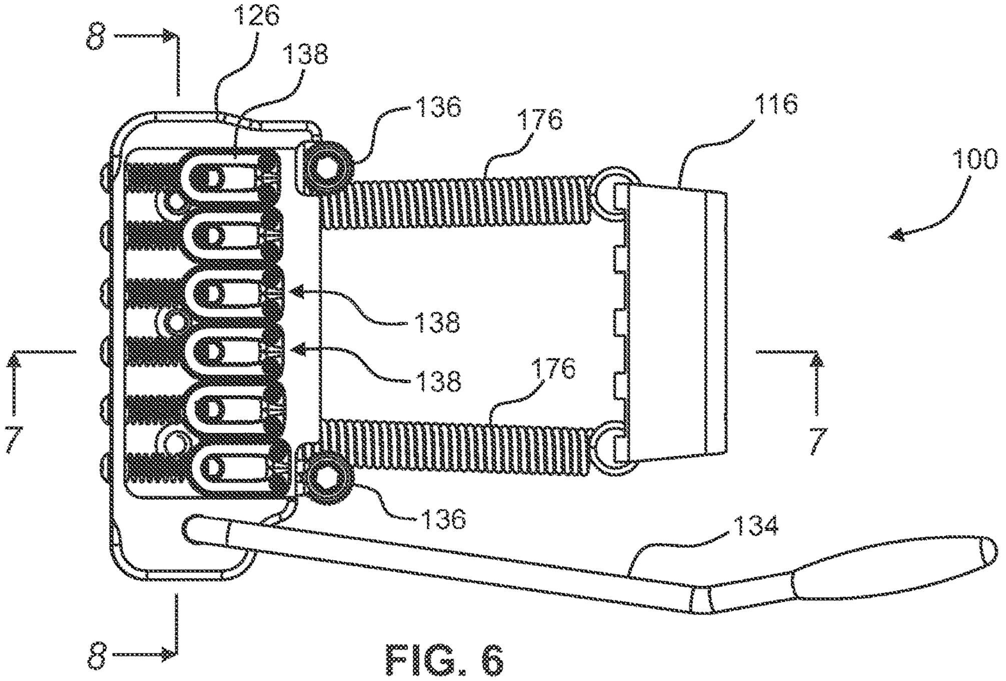
FIG. 6 is a diagrammatic top view of the example guitar tremolo assembly of FIG. 2.
Figure 11:
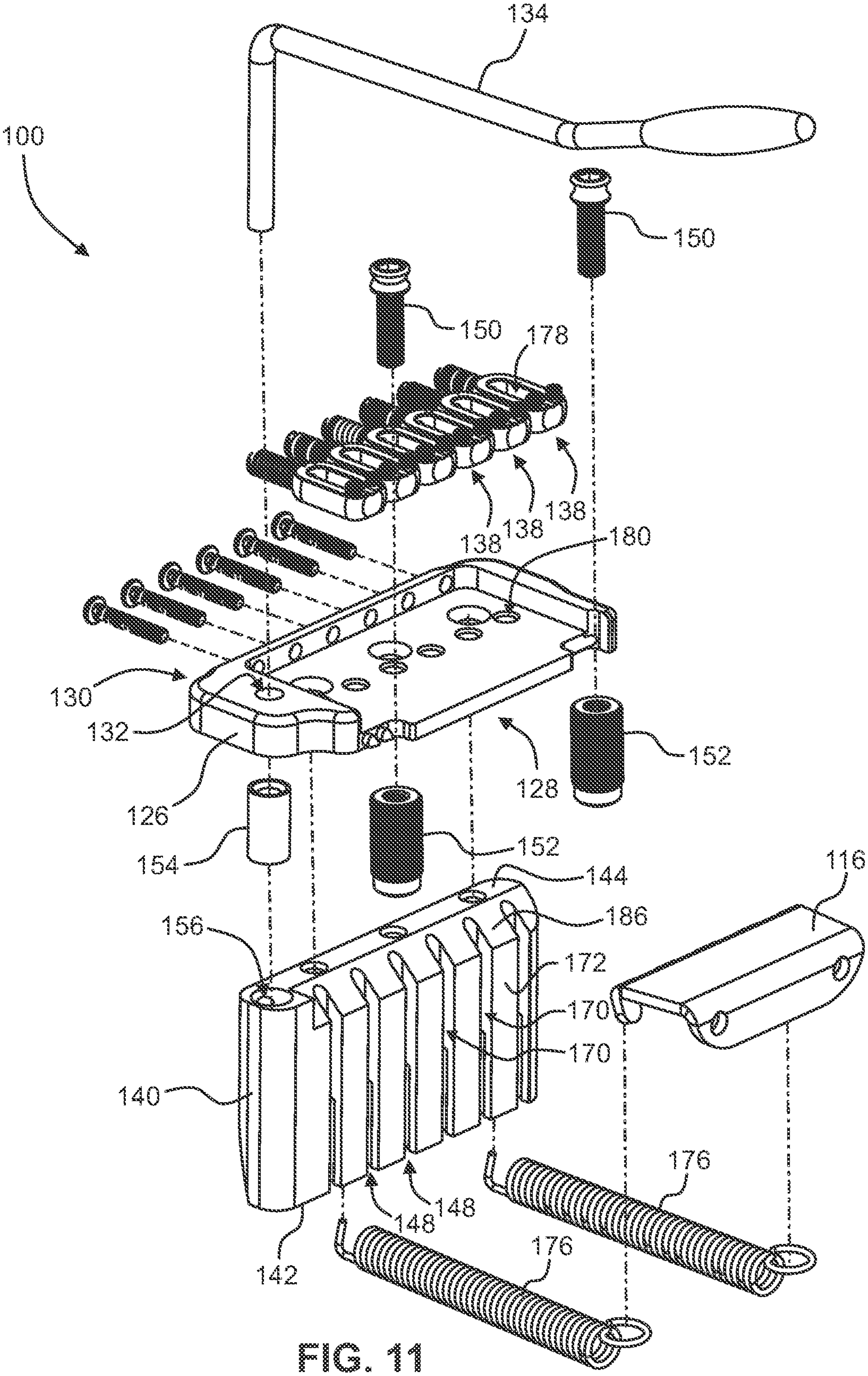
FIG. 11 is a diagrammatic exploded view of the example guitar tremolo assembly of FIG. 2.

Certain non-limiting examples of guitar tremolo assemblies 100 in accordance with the present disclosure are illustrated in FIGS. 2, 30, 35, 42, and 53. Referring to FIGS. 2 and 11, a guitar tremolo assembly 100 may comprise a bridge plate element 126 and a sustain block 140. Referring to FIGS. 1, 7, 11 and 25, the bridge plate element 126 may have a forward portion 128 and a rearward portion 130 opposite thereof, and a plurality of bridge plate string apertures 180. The forward portion 128 may be configured to be placed in pivotable engagement with a plate mounting element 136 of a guitar 102 with the forward portion 128 oriented toward a headstock 104 of the guitar 102. The bridge plate element 126 may be configured to retain a multiplicity of saddle assemblies 138. The saddle assemblies 138 may each define a saddle string aperture 178 therethrough. The sustain block 140 may be selected, for example, from any of the examples disclosed herein, or their equivalents.

Referring to FIGS. 2 and 11, a guitar tremolo assembly 100 may comprise one or more tremolo springs 176 and a spring mounting element 116 by which the tremolo springs 176 are affixed to the guitar body 110. A tremolo arm 134 may mount to the remainder of the assembly 100 by extending through an arm aperture 132 in the bridge plate element 126, and be securely received within an arm socket bore 156 of the sustain block 140. The secure receipt may be by way of, for example, an arm socket element 154. The plate mounting element 136 may be comprise of, for example, a pivot fastener 150 and a mounting stud 152.

Referring to FIGS. 1, 25, 38, 50 and 61, a guitar 102 may comprise various examples of the guitar tremolo assembly 100 described herein. Such a guitar 102 may include a headstock 104, a tail 106, a longitudinal axis 108, a body 110, a neck 112, strings 122, tuning machines 124. The guitar body 110 may include a top 118, a back 120, and a tremolo cavity 114.

Figure 26:
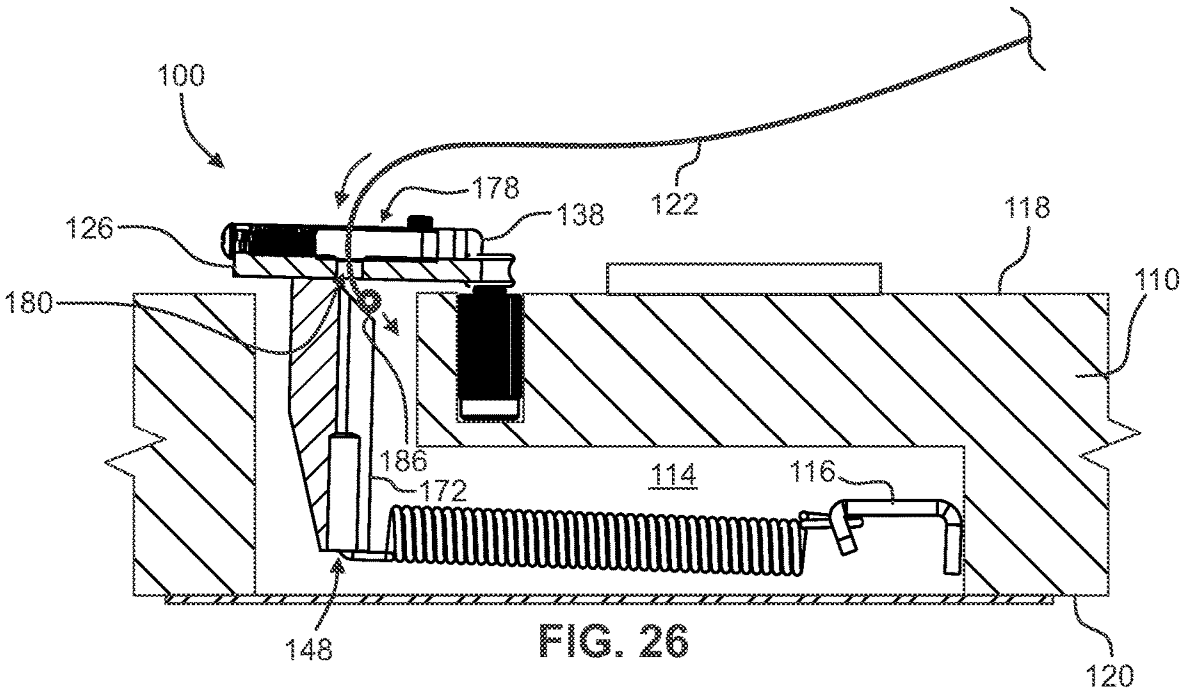
Figure 27:
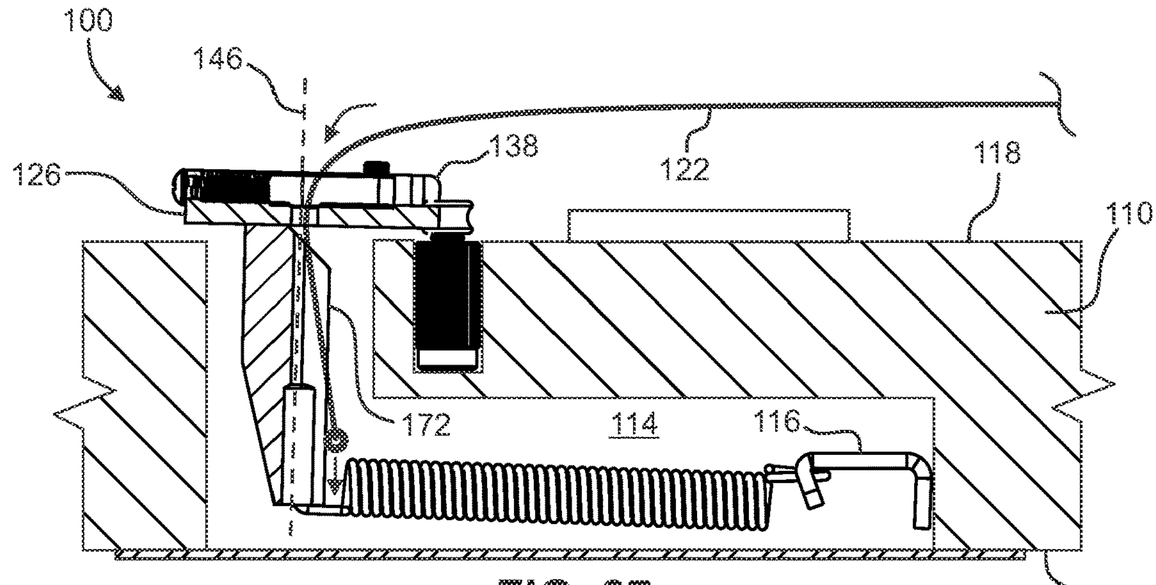
Figure 28:
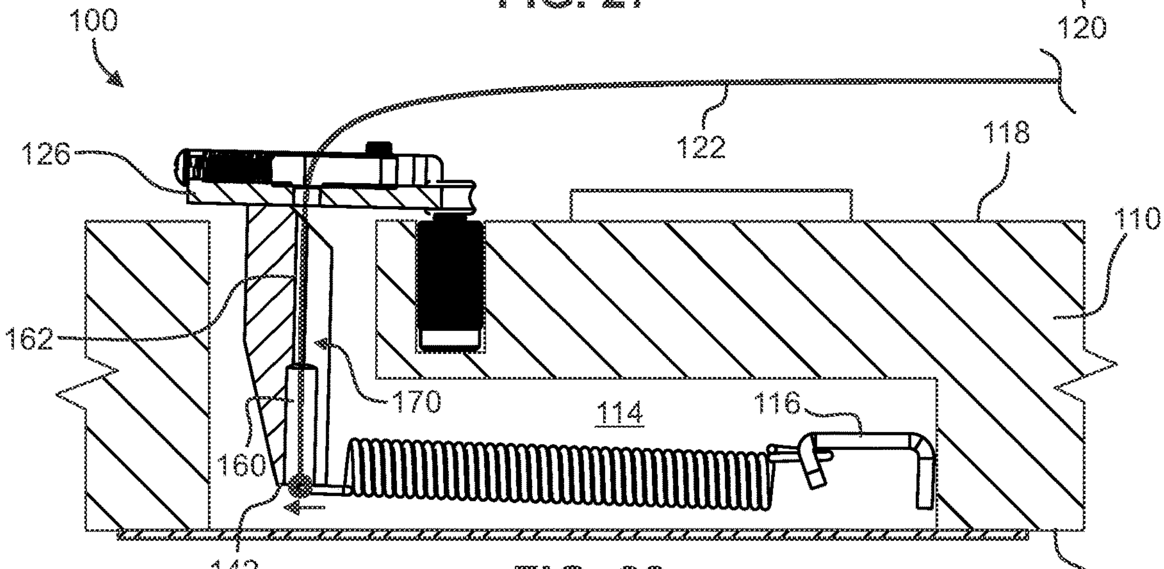

Example methods of installing a string 122 on a guitar 102 are illustrated in FIGS. 25-39, 38-41, 50-52, and 61-63. These methods vary, depending on the particular sustain block 140 being employed as a part of the respective tremolo block assembly 100. However, each of these methods typically begins by providing a guitar 102 having a tremolo assembly 100 such as one disclosed herein, including a bridge plate element 126 and sustain block 140. A ball end 184 of a guitar string 122 is then inserted through a saddle string aperture 178 of one of the saddle assemblies 138. Referring to FIGS. 26, 38, 50, and 61, the ball end 184 is pushed through a bridge plate string aperture 180 in the bridge plate element 126. Referring to FIGS. 27, 39, 51 and

62, the ball end 184 is then moved toward the distal end 142 of the sustain block 140. Referring to FIGS. 28, 40, 51 and 62, the ball end 184 is transported into the ball capture segment 160 of a respective said string retention bore 148. Referring to FIGS. 29, 41, 52, and 63, the ball end 184 is pulled (for example by application of a string tension 182) into engagement with the ball detent 168 of the respective string retention bore 148.

Referring to FIG. 27, in particular examples of the method of installing a string 122 on a guitar 102, each string transfer slot 170 may extend through the forward face 172 to the respective string retention bore 148, the step of moving includes sliding the ball end 184 along the forward face 172. Referring to FIG. 26, if the sustain block 140 includes a ball guide face 186 disposed between the proximal end 144 and the forward face 172, the method may include, after the step of pushing, guiding the ball end 184 toward the forward face 172 by way of the ball guide face 186. Moreover, referring to FIG. 31, if the sustain block 140 includes a ball alignment channel 190, the method may include, after the step of guiding, aligning (e.g., in a side lateral direction 206) the ball end 184 with the respective string transfer slot 170 way of the ball alignment channel 190.

Figure 38:
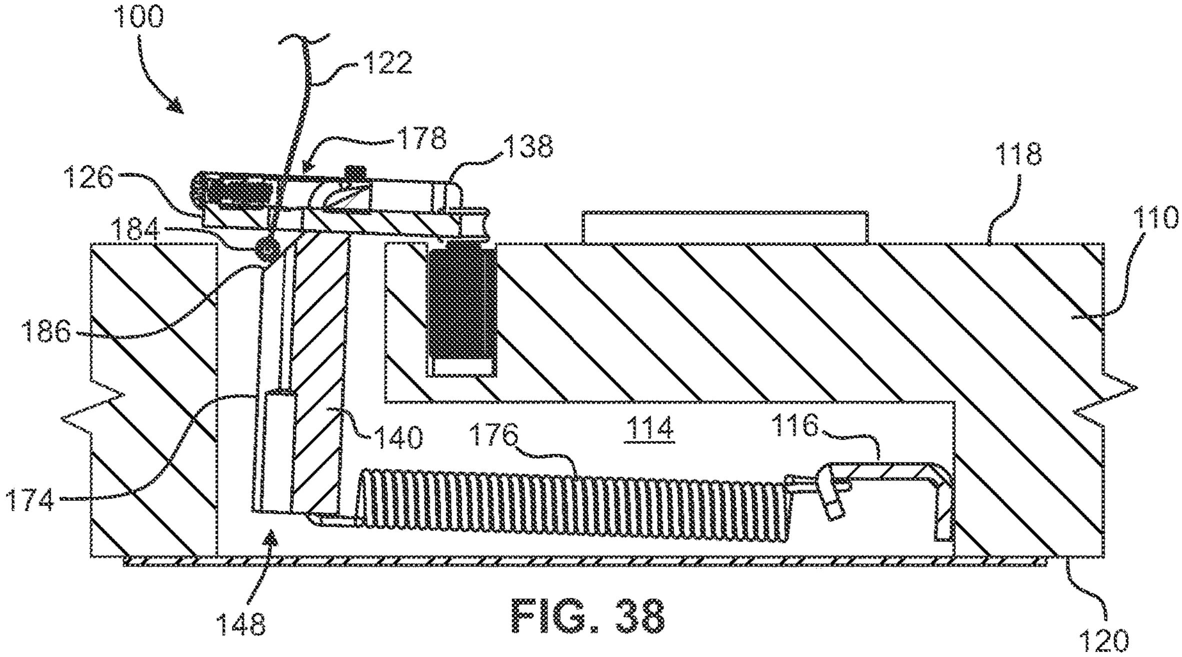
FIGS. 38-41 are diagrammatic partial cross-sectional views of the guitar tremolo assembly of FIG. 35 installed on a guitar, illustrating steps of a method for installing a guitar string on the guitar.
Figure 39:
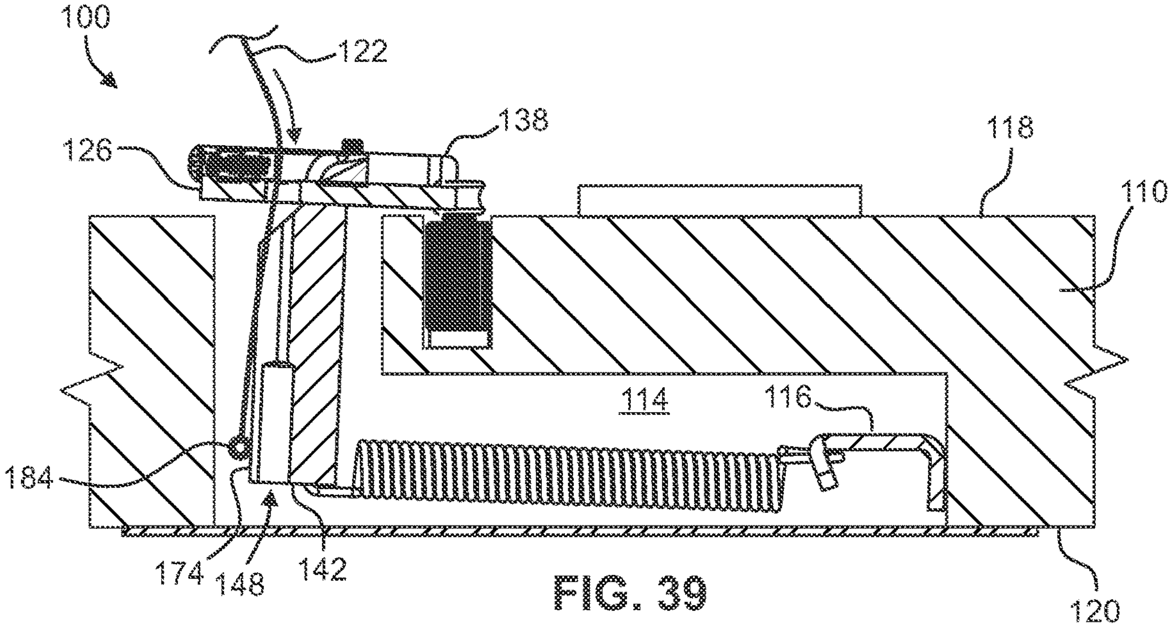
Figure 40:
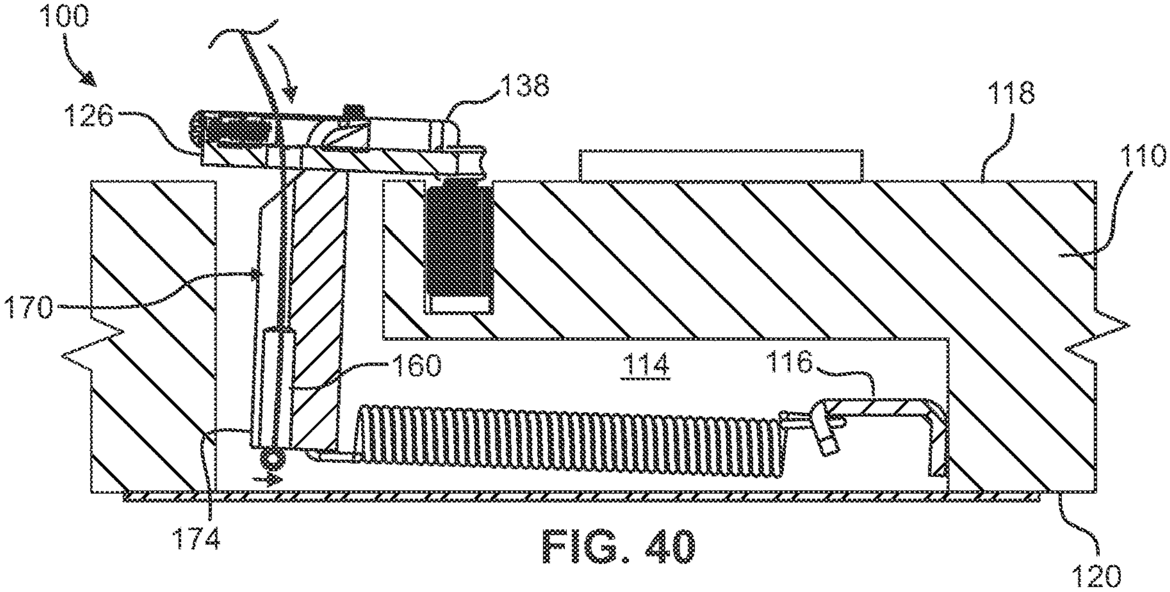
Figure 41:
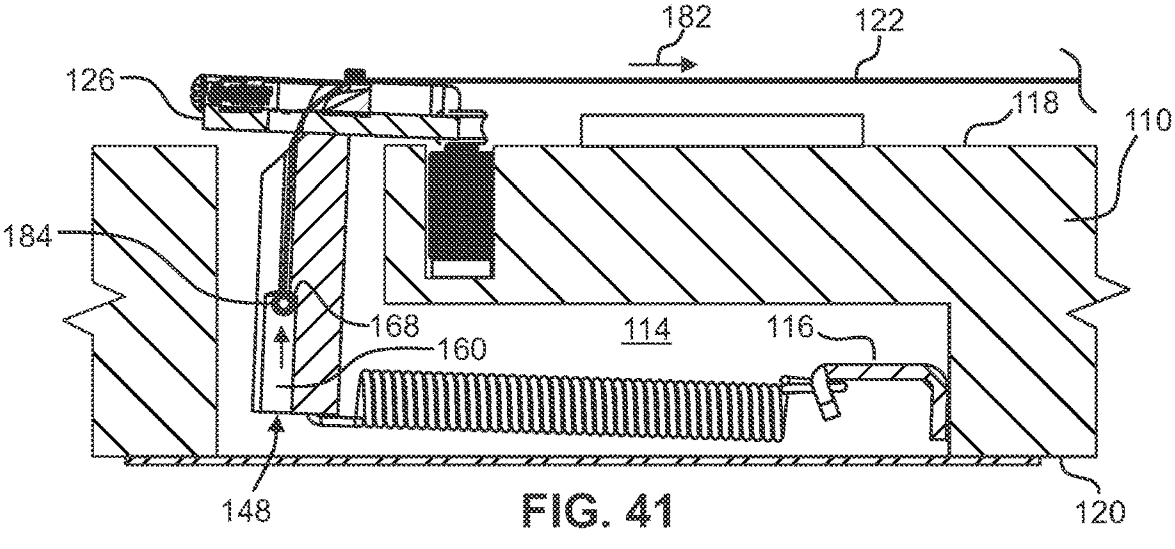
Figure 42:
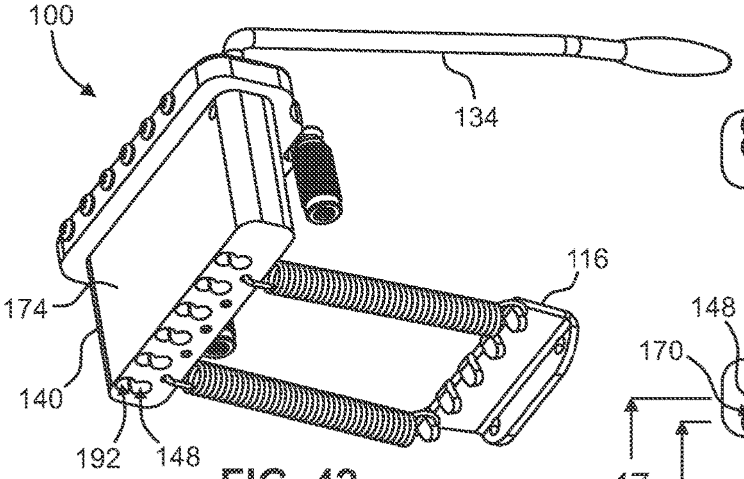
FIG. 42 is a diagrammatic view of a fourth example of a guitar tremolo assembly in accordance with the present disclosure.
Figure 45:
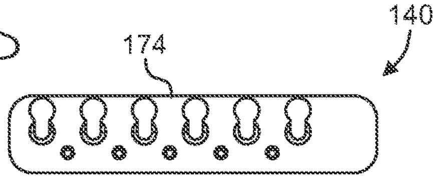
FIG. 45 is a diagrammatic bottom view of the sustain block of FIG. 43.
Figure 64:
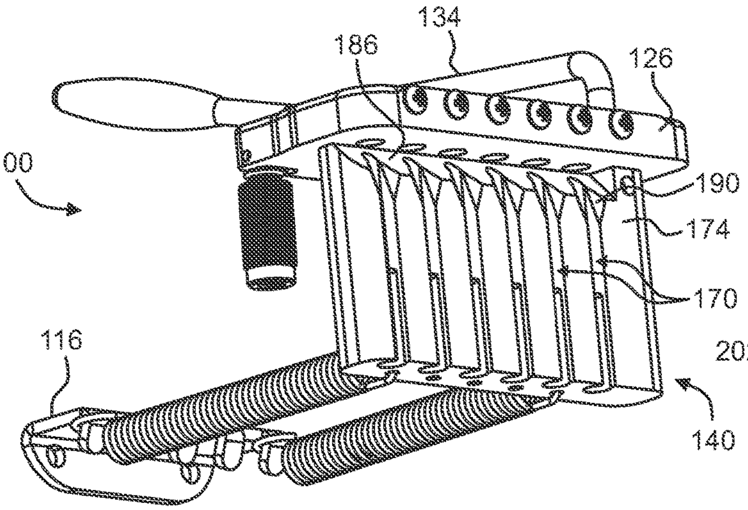
FIG. 64 is a diagrammatic view of a sixth example of a guitar tremolo assembly in accordance with the present disclosure.

Referring to FIGS. 38 and 39, if the string transfer slots 170 of the sustain clock 140 extend through the rearward face 174 to the respective string retention bore 148, the step of moving may include sliding the ball end 184 along the rearward face 174. In such case, if the sustain block further includes a ball guide face 186 disposed between the proximal end 144 and the rearward face 174, the ball guide face being angularly offset from the rearward face, then the method may include, after the step of pushing, guiding the ball end 184 toward the rearward face 174 by way of the ball guide face 186. Moreover, referring to FIGS. 64 and 65, if the sustain block 140 includes a ball alignment channel 190, the method may include, after the step of guiding, aligning (e.g., in a side lateral direction 206) the ball end 184 with the respective string transfer slot 170 way of the ball alignment channel 190.

Figure 50:
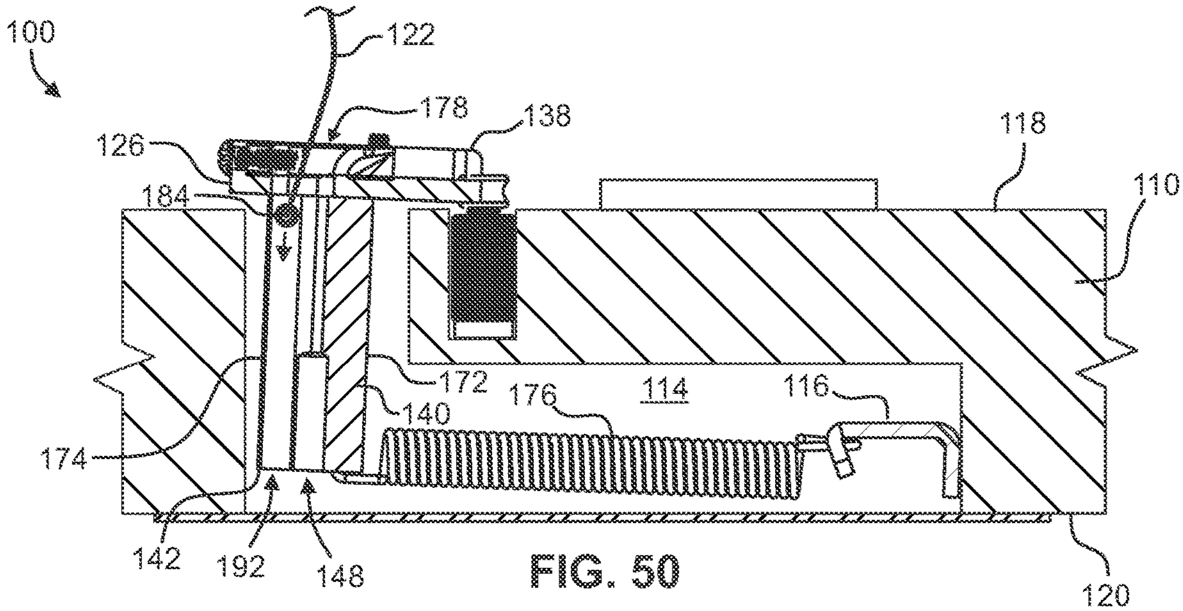
FIGS. 50-52 are diagrammatic partial cross-sectional views of the guitar tremolo assembly of FIG. 42 installed on a guitar, illustrating steps of a method for installing a guitar string on the guitar.
Figure 51:
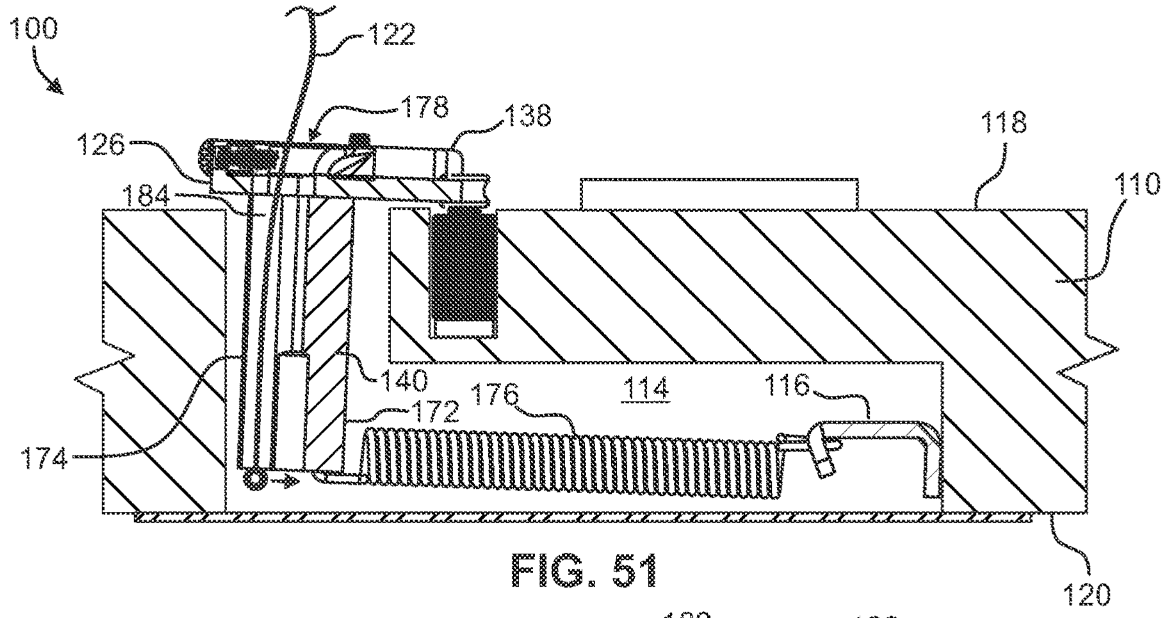
Figure 52:
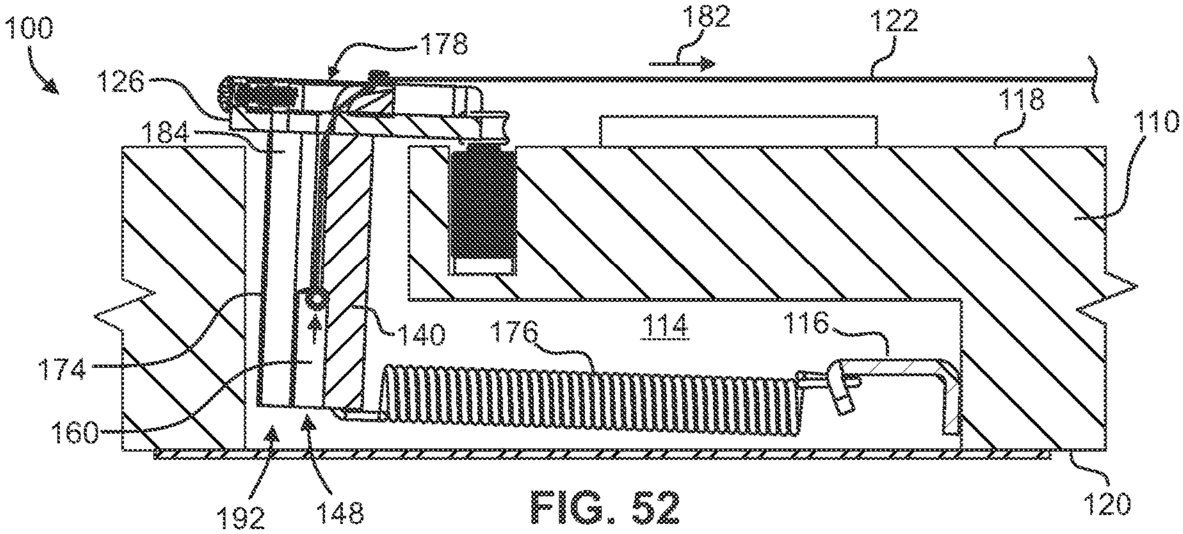
Figure 53:
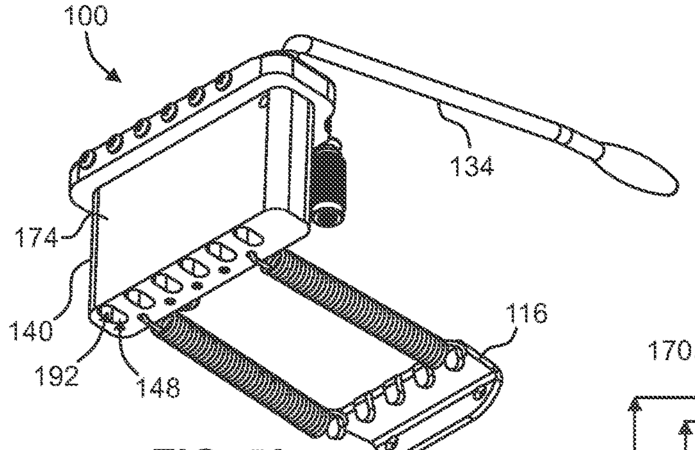
FIG. 53 is a diagrammatic view of a fifth example of a guitar tremolo assembly in accordance with the present disclosure.
Figure 56:
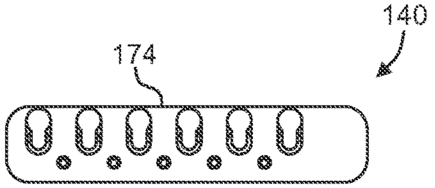
FIG. 56 is a diagrammatic bottom view of the sustain block of FIG. 54.

Referring to FIGS. 50 and 51, if the sustain block 140 includes a plurality of ball passthrough bores 192 extending therethrough, each of the ball passthrough bores being in lateral communication with and extends in parallel with a respective one of the string retention bores by way of the respective string transfer slot, then the step of moving may involve the ball end 184 passing through the respective ball passthrough bore 192. In certain such methods, such as that shown in FIGS. 50-52, the step of moving may involve passing the ball end 184 entirely through the respective ball passthrough bore 192. Alternatively, referring to FIGS. 61-63, the sustain block 140 may include a ball transfer slot 194 laterally disposed between each ball passthrough bore 192 and respective ball capture segment 160. In such case, the step of transporting may involve the ball end 184 passing from the respective ball passthrough bore 192 into the respective ball capture segment 160 by way of the respective ball transfer slot 194, without the ball end 184 needing to first extend outward of the distal end 142 of the sustain block 140.

The following listing matches certain terminology used within this disclosure with corresponding reference numbers used in the non-limiting examples illustrated in the several figures.

100 top-loadable guitar tremolo assembly
102 guitar
104 headstock (of guitar)
106 tail (of guitar)
108 longitudinal axis (of guitar)
110 body (of guitar)
112 neck (of guitar)
114 tremolo cavity (of guitar body)
116 spring mounting element (e.g., mounting claw)
118 top (of guitar body)
120 back (of guitar body)
122 string
124 tuning machines
126 bridge plate element
128 forward portion
130 rearward portion
132 arm aperture (in bridge plate)
134 tremolo arm
136 plate mounting element
138 saddle assembly
140 sustain block
142 distal end
144 proximal end
146 block main axis
148 string retention bore
150 bridge fastener (of plate mounting element; e.g., bridge screw)
152 mounting stud (of plate mounting element)
154 arm socket element
156 arm socket bore (in sustain block element)
158 block fastener element (e.g., screw)
160 ball capture segment (of string retention bore)
162 string housing segment (of string retention bore)
164 ball segment diameter (e.g., about 0.2 inches or about 5 mm)
166 string segment diameter (e.g., about 0.125 inches or about 3.175 mm)
168 ball detent
170 string transfer slot
172 forward face (of sustain block element)
174 rearward face (of sustain block element)
176 tremolo spring
178 saddle string aperture
180 bridge plate string aperture
182 string tension
184 ball end (of string)
186 ball guide face (also, "guide ramp")
188 angular offset (ball guide angle)
190 ball alignment channel
192 ball passthrough bore
194 ball transfer slot (between string retention bore and ball passthrough bore)
196 passthrough bore diameter (e.g., about 0.2 inches or about 5 mm)
198 slot width (of string transfer slot) (e.g., about 0.125 inches or about 3.175 mm)
200 direction of pivot of bridge plate due to engagement with plate mounting element
202 block side (of sustain block)
204 front lateral direction
206 side lateral direction While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sustain block for a guitar tremolo assembly, the sustain block extending along a block main axis from a distal end to a proximal end, the proximal end being configured to be affixed to a bridge plate element of the guitar tremolo assembly, the sustain block having a plurality of string retention bores extending therethrough in parallel with the block main axis, each string retention bore being linearly straight and having a ball capture segment and a string housing segment, the ball capture segment being located between the string housing segment and the distal end, each string retention bore having a ball detent defined between the ball capture segment and the string housing segment, the ball detent being configured to prevent a string ball end from passing from the ball capture segment into the string housing segment, each of the string retention bores being in communication with a respective string transfer slot disposed laterally thereof, the sustain block having a forward face and a rearward face disposed oppositely of one another, the forward face being configured to be oriented toward a headstock of a guitar when the bridge plate element is in pivotable engagement with a plate mounting element of the guitar.

2. The sustain block as defined in claim 1, wherein each string transfer slot extends through the forward face to the respective string retention bore.

3. The sustain block as defined in claim 2, wherein the sustain block includes a ball guide face disposed between the proximal end and the forward face, the ball guide face being angularly offset from the forward face by 30 to 60 degrees.

4. The sustain block as defined in claim 3, wherein the sustain block includes a ball alignment channel disposed at each junction between the forward face, the ball guide face and the string transfer slots.

5. The sustain block as defined in claim 4, wherein each ball alignment channel is defined by a pair of surfaces angularly offset from the forward face and the ball guide face.

6. The sustain block as defined in claim 1, wherein each string transfer slot extends through the rearward face to the respective string retention bore.

7. The sustain block as defined in claim 6, wherein the sustain block includes a ball guide face disposed between the proximal end and the rearward face, the ball guide face being angularly offset from the rearward face by 30 to 60 degrees.

8. The sustain block as defined in claim 7, wherein the sustain block includes a ball alignment channel disposed at each junction between the rearward face, the ball guide face and the string transfer slots.

9. The sustain block as defined in claim 8, wherein each ball alignment channel is defined by a pair of surfaces angularly offset from the rearward face and the ball guide face.

10. The sustain block as defined in claim 1, wherein (a) the sustain block includes a plurality of ball passthrough bores extending therethrough;

(b) each of the ball passthrough bores is in lateral communication with and extends in parallel with a respective one of the string retention bores; and (c) the lateral communication is by way of the respective string transfer slot being disposed laterally between the ball passthrough bore and the string retention bore.

11. The sustain block as defined in claim 10, wherein the ball passthrough bores each have a passthrough bore diameter configured to enable a ball end of a guitar string to pass entirely through the ball passthrough bore.

12. The sustain block as defined in claim 10, wherein (a) the sustain block includes a ball transfer slot laterally disposed between each ball passthrough bore and respective ball capture segment;

(b) the ball transfer slot is positioned between the respective string transfer slot and the distal end; and (c) the ball transfer slot is configured to allow a ball end of a guitar string to pass laterally therethrough from the respective ball passthrough bore to the respective ball capture segment.

13. The sustain block as defined in claim 10, wherein neither the ball passthrough bores nor the string retention bores are in lateral communication with the forward or rearward faces.

14. The sustain block as defined in claim 1, wherein (a) the string transfer slots each have a slot width;

(b) the ball capture segments each have a ball segment diameter; and (c) the slot width is smaller than the ball segment diameter.

15. The sustain block as defined in claim 14, wherein the slot width is configured to prevent a ball end of a guitar string from passing through the string transfer slots.

16. A guitar tremolo assembly comprising:

a bridge plate element having a forward portion configured to be placed in pivotable engagement with a plate mounting element of a guitar with the forward portion oriented toward a headstock of the guitar, the bridge plate element being configured to retain a multiplicity of saddle assemblies; and a sustain block extending along a block main axis from a distal end to a proximal end, the proximal end being configured to be affixed to the bridge plate element, the sustain block having a plurality of string retention bores extending therethrough in parallel with the block main axis, each string retention bore being linearly straight and having a ball capture segment and a string housing segment, the ball capture segment being located between the string housing segment and the distal end, each string retention bore having a ball detent defined between the ball capture segment and the string housing segment, the ball detent being configured to prevent a string ball end from passing from the ball capture segment into the string housing segment, each of the string retention bores being in communication with a respective string transfer slot disposed laterally thereof, the sustain block having a forward face and a rearward face disposed oppositely of one another, the forward face being configured to be oriented toward a headstock of the guitar when the bridge plate element is in the pivotable engagement.

17. The guitar tremolo assembly as defined in claim 16, wherein each string transfer slot extends through the forward face to the respective string retention bore.

18. The guitar tremolo assembly as defined in claim 17, wherein the sustain block includes a ball guide face disposed between the proximal end and the forward face, the ball guide face being angularly offset from the forward face by 30 to 60 degrees.

19. The guitar tremolo assembly as defined in claim 18, wherein the sustain block includes a ball alignment channel disposed at each junction between the forward face, the ball guide face and the string transfer slots.

20. The guitar tremolo assembly as defined in claim 19, wherein each ball alignment channel is defined by a pair of surfaces angularly offset from the forward face and the ball guide face.

21. The guitar tremolo assembly as defined in claim 16, wherein each string transfer slot extends through the rearward face to the respective string retention bore.

22. The guitar tremolo assembly as defined in claim 21, wherein the sustain block includes a ball guide face disposed between the proximal end and the rearward face, the ball guide face being angularly offset from the rearward face by 30 to 60 degrees.

23. The guitar tremolo assembly as defined in claim 22, wherein the sustain block includes a ball alignment channel disposed at each junction between the rearward face, the ball guide face and the string transfer slots.

24. The guitar tremolo assembly as defined in claim 23, wherein each ball alignment channel is defined by a pair of surfaces angularly offset from the rearward face and the ball guide face.

25. The guitar tremolo assembly as defined in claim 16, wherein (a) the sustain block includes a plurality of ball passthrough bores extending therethrough;

(b) each of the ball passthrough bores is in lateral communication with and extends in parallel with a respective one of the string retention bores; and (c) the lateral communication is by way of the respective string transfer slot being disposed laterally between the ball passthrough bore and the string retention bore.

26. The guitar tremolo assembly as defined in claim 25, wherein the ball passthrough bores each have a passthrough bore diameter configured to enable a ball end of a guitar string to pass entirely through the ball passthrough bore.

27. The guitar tremolo assembly as defined in claim 25, wherein (a) the sustain block includes a ball transfer slot laterally disposed between each ball passthrough bore and respective ball capture segment;

(b) the ball transfer slot is positioned between the respective string transfer slot and the distal end; and (c) the ball transfer slot is configured to allow a ball end of a guitar string to pass laterally therethrough from the respective ball passthrough bore to the respective ball capture segment.

28. The guitar tremolo assembly as defined in claim 25, wherein neither the ball passthrough bores nor the string retention bores are in lateral communication with the forward or rearward faces.

29. The guitar tremolo assembly as defined in claim 16, wherein (a) the string transfer slots each have a slot width;

(b) the ball capture segments each have a ball segment diameter; and (c) the slot width is smaller than the ball segment diameter.

30. The guitar tremolo assembly as defined in claim 29, wherein the slot width is configured to prevent a ball end of a guitar string from passing through the string transfer slots.

31. A guitar comprising the guitar tremolo assembly of claim 16.

32. A method of installing a string on a guitar, the method comprising:

providing a guitar having a tremolo assembly, the tremolo assembly including (i) a bridge plate element having a forward portion in pivotable engagement with a plate mounting element of a guitar with the forward portion oriented toward a headstock of the guitar, the bridge plate element being configured to retain a multiplicity of saddle assemblies; and (ii) a sustain block extending along a block main axis from a distal end to a proximal end, the proximal end being configured to be affixed to the bridge plate element, the sustain block having a plurality of string retention bores extending therethrough in parallel with the block main axis, each string retention bore being linearly straight and having a ball capture segment and a string housing segment, the ball capture segment being located between the string housing segment and the distal end, each string retention bore having a ball detent defined between the ball capture segment and the string housing segment, the ball detent being configured to prevent a string ball end from passing from the ball capture segment into the string housing segment, each of the string retention bores being in communication with a respective string transfer slot disposed laterally thereof, the sustain block having a forward face and a rearward face disposed oppositely of one another, the forward face being configured to be oriented toward a headstock of the guitar when the bridge plate element is in the pivotable engagement;

inserting a ball end of a guitar string through a saddle string aperture of one of the saddle assemblies;

pushing the ball end through a bridge plate string aperture in the bridge plate element;

after the step of pushing, moving the ball end toward the distal end;

transporting the ball end into the ball capture segment of a respective said string retention bore; and pulling the ball end into engagement with the ball detent of the respective said string retention bore.

33. The method as defined in claim 32, wherein each string transfer slot extends through the forward face to the respective string retention bore; and the step of moving includes sliding the ball end along the forward face.

34. The method as defined in claim 33, wherein the sustain block includes a ball guide face disposed between the proximal end and the forward face, the ball guide face being angularly offset from the forward face by 30 to 60 degrees; and the method includes, after the step of pushing, guiding the ball end toward the forward face by way of the ball guide face.

35. The method as defined in claim 34, wherein the sustain block includes a ball alignment channel disposed at each junction between the forward face, the ball guide face and the string transfer slots; and the method includes, after the step of guiding, aligning the ball end with the respective string transfer slot way of the ball alignment channel.

36. The method as defined in claim 35, wherein each ball alignment channel is defined by a pair of surfaces angularly offset from the forward face and the ball guide face.

37. The method as defined in claim 32, wherein each string transfer slot extends through the rearward face to the respective string retention bore; and the step of moving includes sliding the ball end along the rearward face.

38. The method as defined in claim 37, wherein the sustain block includes a ball guide face disposed between the proximal end and the rearward face, the ball guide face being angularly offset from the rearward face by 30 to 60 degrees; and the method includes, after the step of pushing, guiding the ball end toward the rearward face by way of the ball guide face.

39. The method as defined in claim 32, wherein the sustain block includes a plurality of ball passthrough bores extending therethrough;

each of the ball passthrough bores is in lateral communication with and extends in parallel with a respective one of the string retention bores;

the lateral communication is by way of the respective string transfer slot being disposed laterally between the ball passthrough bore and the string retention bore; and the step of moving involves the ball end passing through the respective ball passthrough bore.

40. The method as defined in claim 39, wherein the step of moving involves passing the ball end entirely through the respective ball passthrough bore.

41. The method as defined in claim 39, wherein the sustain block includes a ball transfer slot laterally disposed between each ball passthrough bore and respective ball capture segment;

the ball transfer slot is positioned between the respective string transfer slot and the distal end;

the ball transfer slot is configured to allow a ball end of a guitar string to pass laterally therethrough from the respective ball passthrough bore to the respective ball capture segment; and the step of transporting involves the ball end passing from the respective ball passthrough bore into the respective ball capture segment by way of the respective ball transfer slot.

42. The method as defined in claim 39, wherein neither the ball passthrough bores nor the string retention bores are in lateral communication with the forward or rearward faces.

43. The method as defined claim 32, wherein (a) the string transfer slots each have a slot width;

(b) the ball capture segments each have a ball segment diameter; and (c) the slot width is smaller than the ball segment diameter.

* * * * *